US008064317B2

(12) United States Patent
Nagatomi

(10) Patent No.: US 8,064,317 B2
(45) Date of Patent: Nov. 22, 2011

(54) OPTICAL PICKUP APPARATUS AND FOCAL-POINT ADJUSTING METHOD

(75) Inventor: Kenji Nagatomi, Kaizu (JP)

(73) Assignee: Sanyo Electric Co., Ltd., Osaka (JP)

( * ) Notice: Subject to any disclaimer, the term of this patent is extended or adjusted under 35 U.S.C. 154(b) by 427 days.

(21) Appl. No.: 12/397,792

(22) Filed: Mar. 4, 2009

(65) Prior Publication Data
US 2009/0225645 A1 Sep. 10, 2009

(30) Foreign Application Priority Data
Mar. 4, 2008 (JP) ................................. 2008-054147

(51) Int. Cl.
*G11B 7/00* (2006.01)

(52) U.S. Cl. ........... 369/112.19; 369/112.12; 369/44.23; 369/112.03; 369/44.42

(58) Field of Classification Search ........................ None
See application file for complete search history.

(56) References Cited

U.S. PATENT DOCUMENTS

| 2002/0048233 | A1 | 4/2002 | Ogasawara et al. | |
|---|---|---|---|---|
| 2007/0109946 | A1 | 5/2007 | Hiraga et al. | |
| 2008/0165655 | A1 | 7/2008 | Saitoh et al. | |
| 2009/0225645 | A1* | 9/2009 | Nagatomi ................. | 369/112.23 |
| 2010/0027386 | A1* | 2/2010 | Nagatomi et al. ......... | 369/44.32 |
| 2010/0027404 | A1* | 2/2010 | Nagatomi et al. ........ | 369/112.23 |
| 2010/0027405 | A1* | 2/2010 | Nagatomi et al. ........ | 369/112.23 |
| 2010/0080106 | A1* | 4/2010 | Nagatomi et al. ........ | 369/112.26 |
| 2010/0091634 | A1* | 4/2010 | Murata et al. ............ | 369/112.23 |
| 2011/0063967 | A1* | 3/2011 | Nakamura et al. ........ | 369/112.03 |

FOREIGN PATENT DOCUMENTS

| JP | 2002-92905 A | 3/2002 |
|---|---|---|
| JP | 2006-252716 A | 9/2006 |
| JP | 2006-260669 A | 9/2006 |
| JP | 2007-164957 A | 6/2007 |
| JP | 2008-102998 A | 5/2008 |
| JP | 2008-171470 A | 7/2008 |

(Continued)

OTHER PUBLICATIONS

Explanation of Circumstances filed in the corresponding Japanese Application No. 2008-054147, filed Jun. 3, 2010, pp. 1-11, Japan.

(Continued)

*Primary Examiner* — Joseph Feild
*Assistant Examiner* — Parul Gupta
(74) *Attorney, Agent, or Firm* — Ditthavong Mori & Steiner, P.C.

(57) ABSTRACT

An optical pickup apparatus is provided with: an astigmatic element for introducing astigmatism to a reflected light from a recording medium; and an optical element for varying advancing directions of luminous fluxes within four different luminous flux regions with one another, out of the reflected light, so as to scatter the luminous fluxes within the four luminous flux regions with one another. When an intersecting point of two mutually crossing straight lines respectively parallel to a first direction by the astigmatic element and a second direction vertical to the first convergence direction is aligned to an optical axis of the reflected light, the two luminous flux regions are placed in a direction where a set of vertical angles created by the two straight lines forms a line, and the remaining two luminous flux regions are placed in a direction where the other set of vertical angles forms a line.

11 Claims, 22 Drawing Sheets

FOREIGN PATENT DOCUMENTS

| | | |
|---|---|---|
| JP | 2009-3986 A | 1/2009 |
| JP | 2009-9630 A | 1/2009 |
| JP | 2009-157978 A | 7/2009 |
| JP | 2009-170060 A | 7/2009 |
| WO | WO 2004/040562 A1 | 5/2004 |
| WO | WO2007/105704 A1 | 9/2007 |
| WO | WO2008/007768 A1 | 1/2008 |
| WO | WO2008/053548 A1 | 5/2008 |

OTHER PUBLICATIONS

Japanese Office Action for corresponding JP Application No. 2008-054147, dated Jul. 6, 2010, pp. 1-7 Japan.

* cited by examiner (a) PARALLEL LIGHT PORTION (b) ON S1 PLANE SURFACE (c) ON S0 PLANE SURFACE (d) ON S2 PLANE SURFACE (a) PARALLEL LIGHT PORTION <STRAY LIGHT 2>
(b) ON S1 PLANE SURFACE
(c) ON S0 PLANE SURFACE
(d) ON S2 PLANE SURFACE

CONVERGENCE STATE OF LIGHT RAY

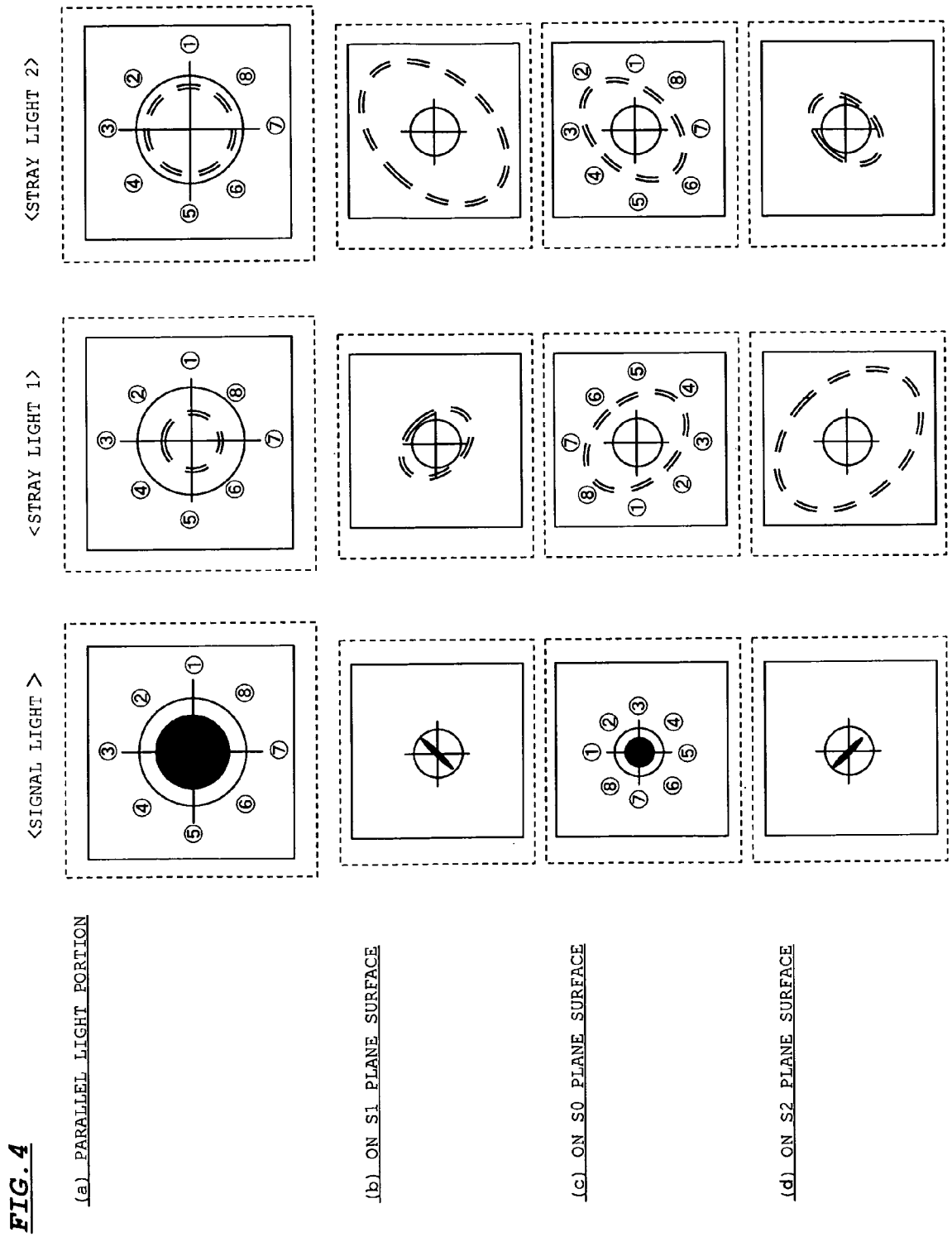

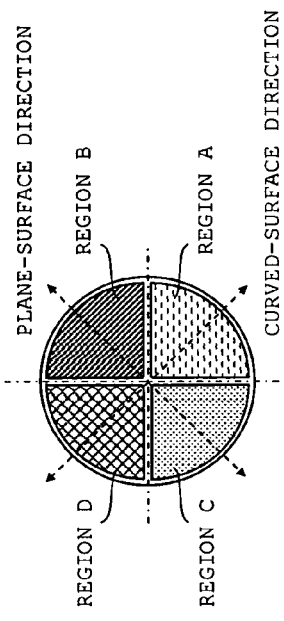
FIG.5A  LUMINOUS FLUX SPLITTING PATTERN
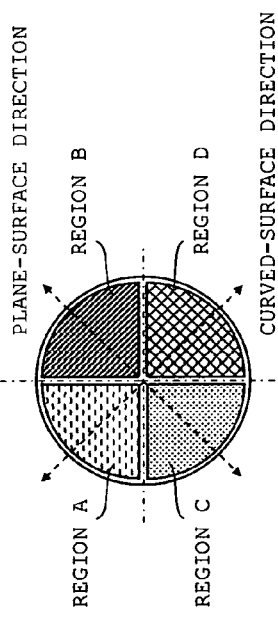
FIG.5B  SIGNAL LIGHT
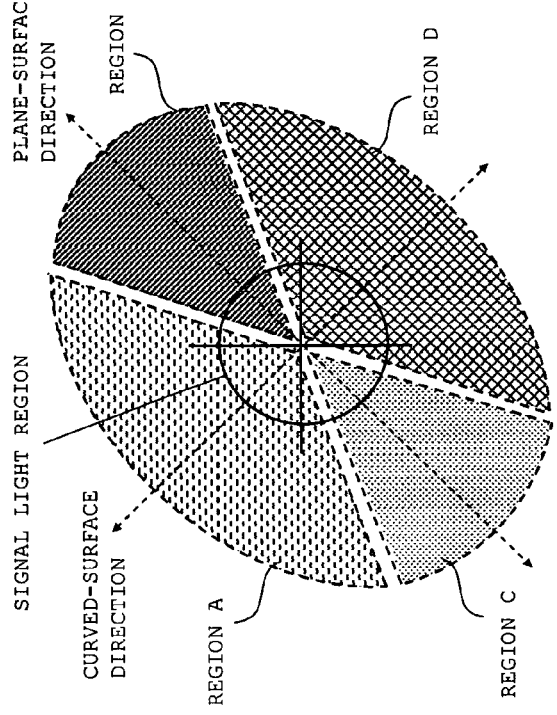
FIG.5C  STRAY LIGHT 1
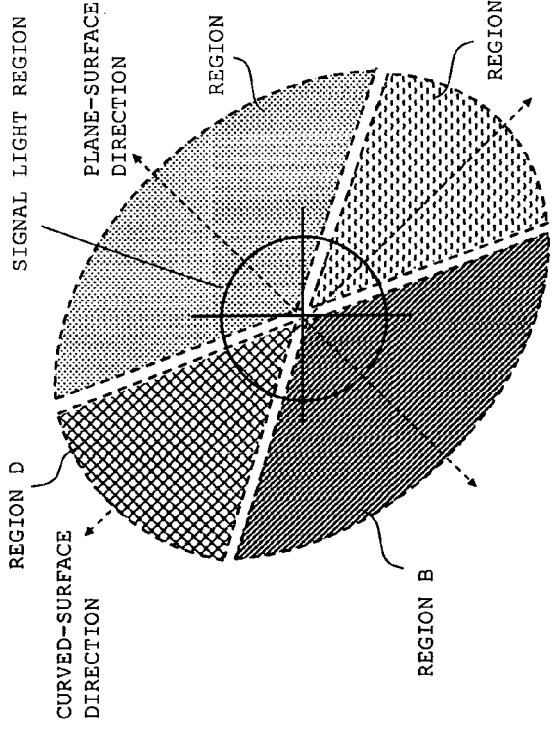
FIG.5D  STRAY LIGHT 2

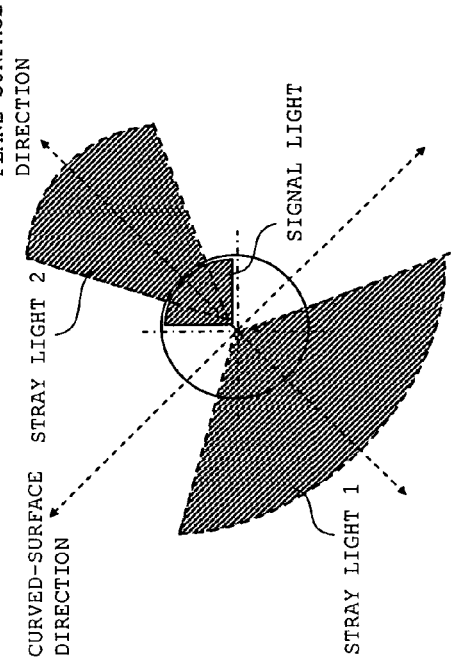
FIG. 6A  LUMINOUS FLUX STATE OF REGION A
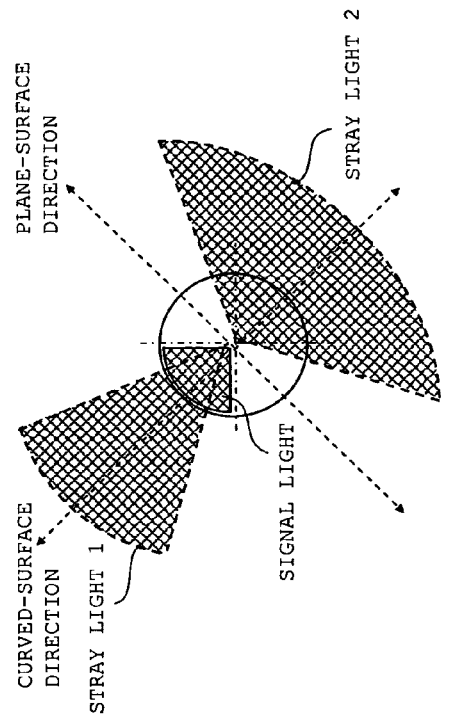
FIG. 6B  LUMINOUS FLUX STATE OF REGION B
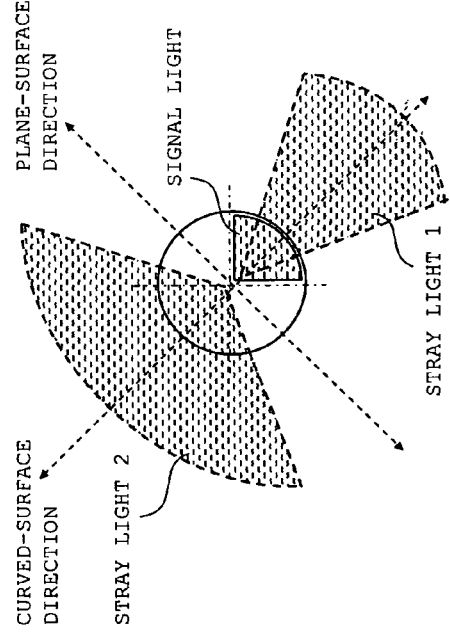
FIG. 6C  LUMINOUS FLUX STATE OF REGION C
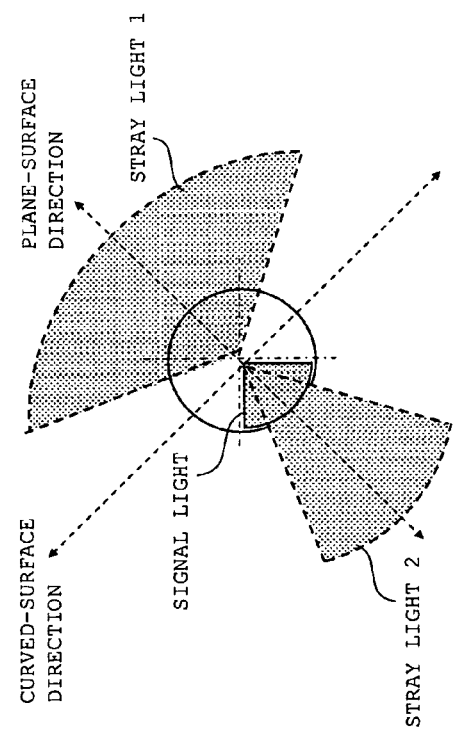
FIG. 6D  LUMINOUS FLUX STATE OF REGION D

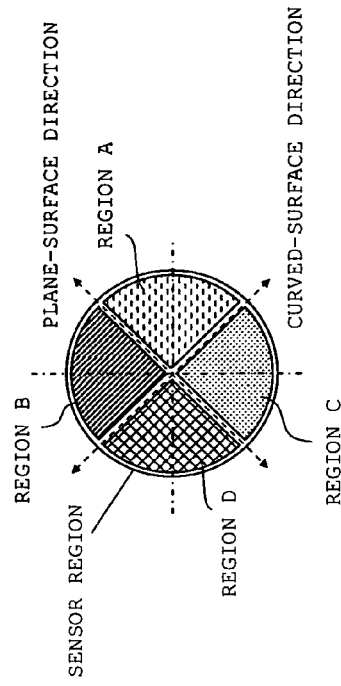
FIG. 7A LUMINOUS FLUX SPLITTING PATTERN
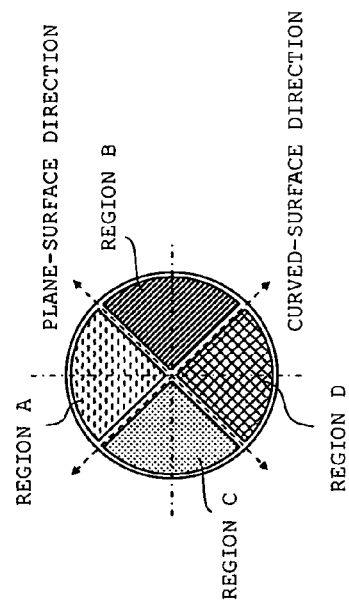
FIG. 7B SIGNAL LIGHT
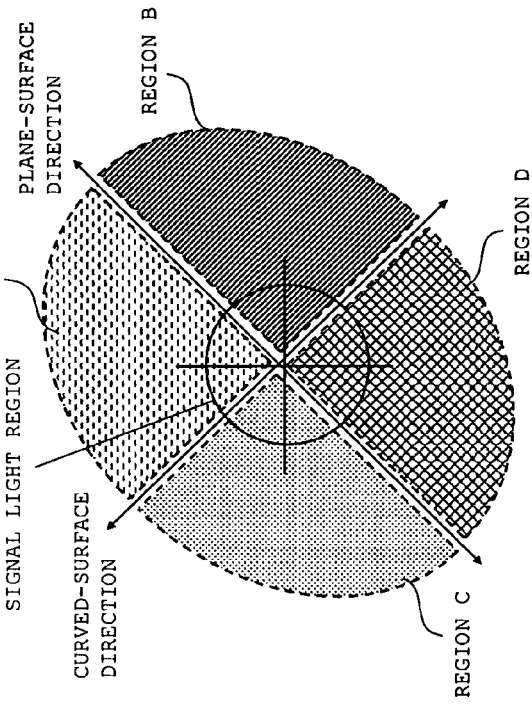
FIG. 7C STRAY LIGHT 1
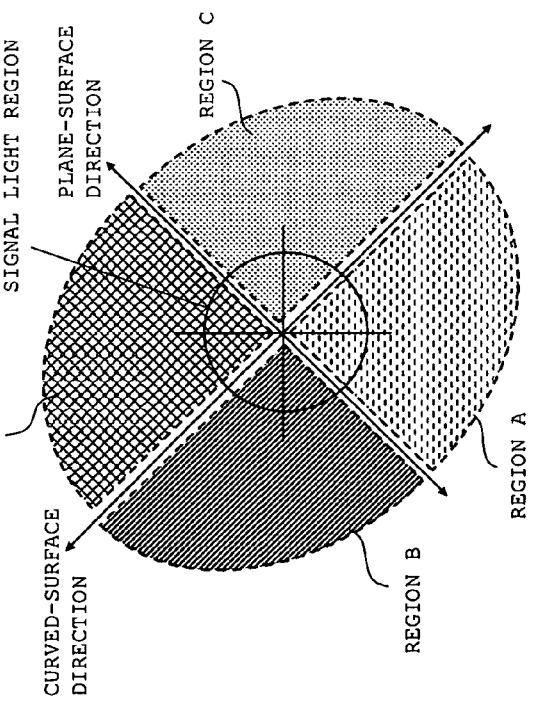
FIG. 7D STRAY LIGHT 2

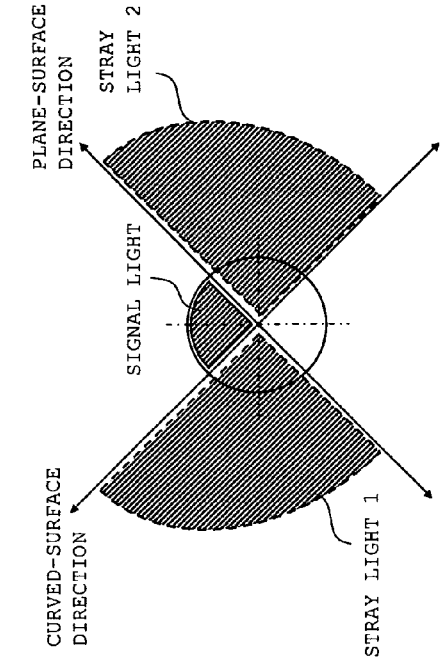
FIG.8B LUMINOUS FLUX STATE OF REGION B
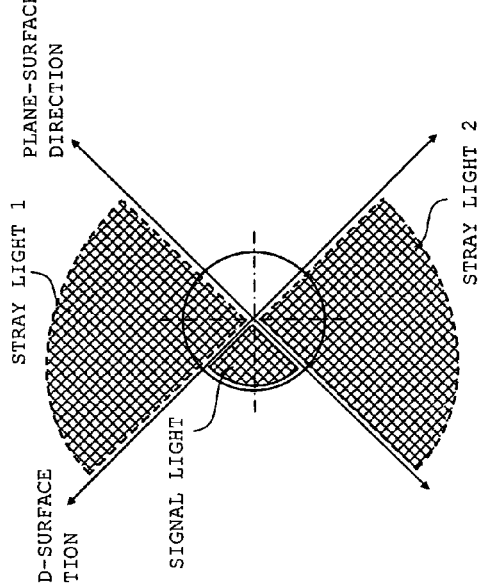
FIG.8D LUMINOUS FLUX STATE OF REGION D
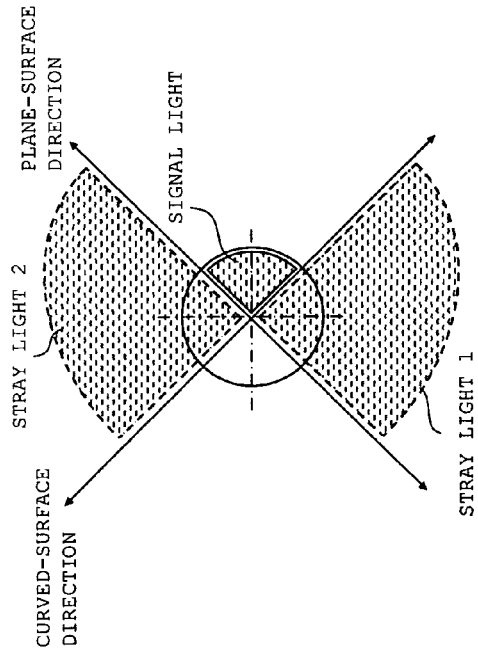
FIG.8A LUMINOUS FLUX STATE OF REGION A
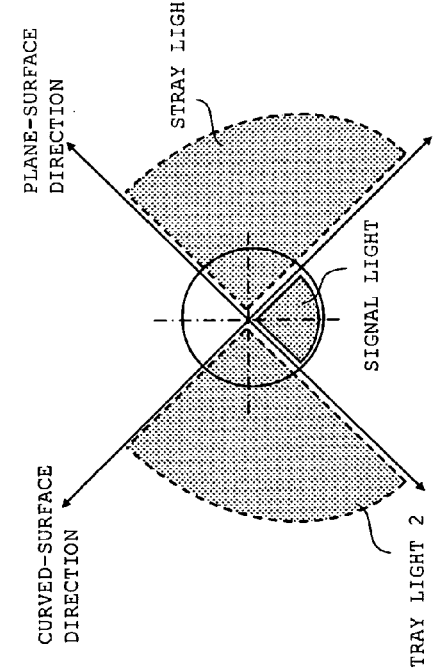
FIG.8C LUMINOUS FLUX STATE OF REGION C

LUMINOUS FLUX ON S0 PLANE SURFACE

ANGULAR PROVISION TO EACH REGION $$FE = (A+B+E+F) - (C+D+G+H)$$
$$PP = (A+B+G+H) - (C+D+E+F)$$

$$FE = (A+B+E+F) - (C+D+G+H)$$
$$PP = (A+B+G+H) - (C+D+E+F)$$

$FE = (A+B+E+F) - (C+D+G+H)$ $FE = (A+B+E+F) - (C+D+G+H)$ $PP = (A+B+G+H) - (C+D+E+F)$ $PP = (A+B+G+H) - (C+D+E+F)$

PP = (A+B+G+H) - (C+D+E+F)

PP = (A+B+G+H) - (C+D+E+F)

FE = (A+B+E+F) - (C+D+G+H)

FE = (A+B+E+F) - (C+D+G+H)

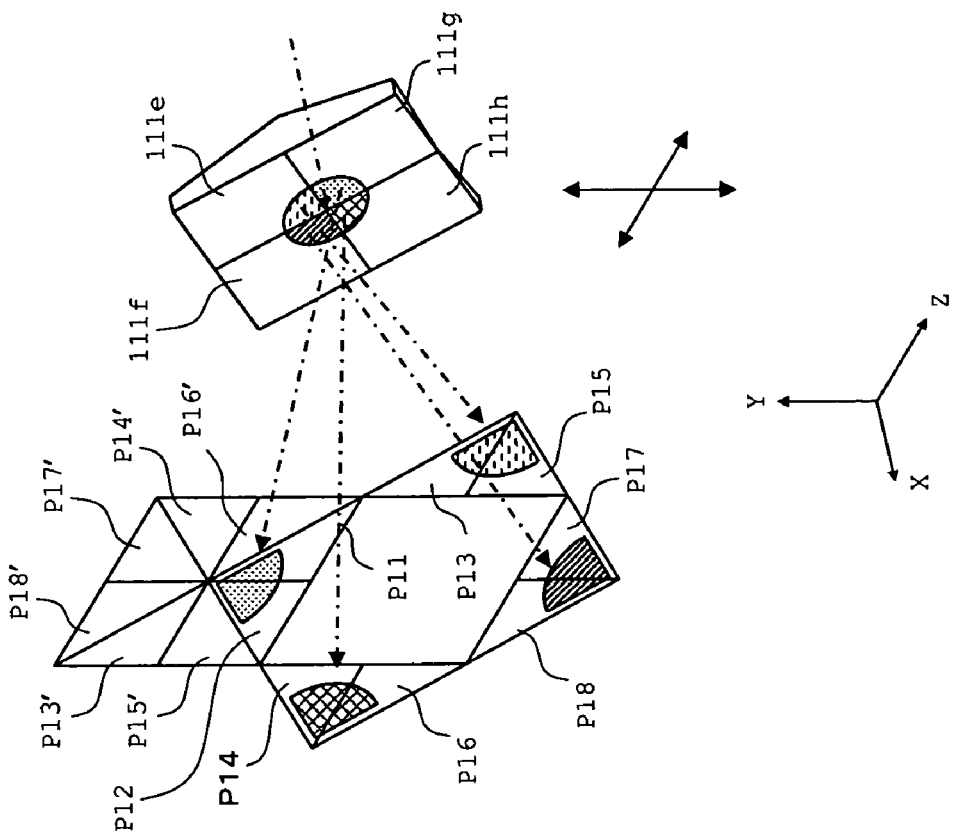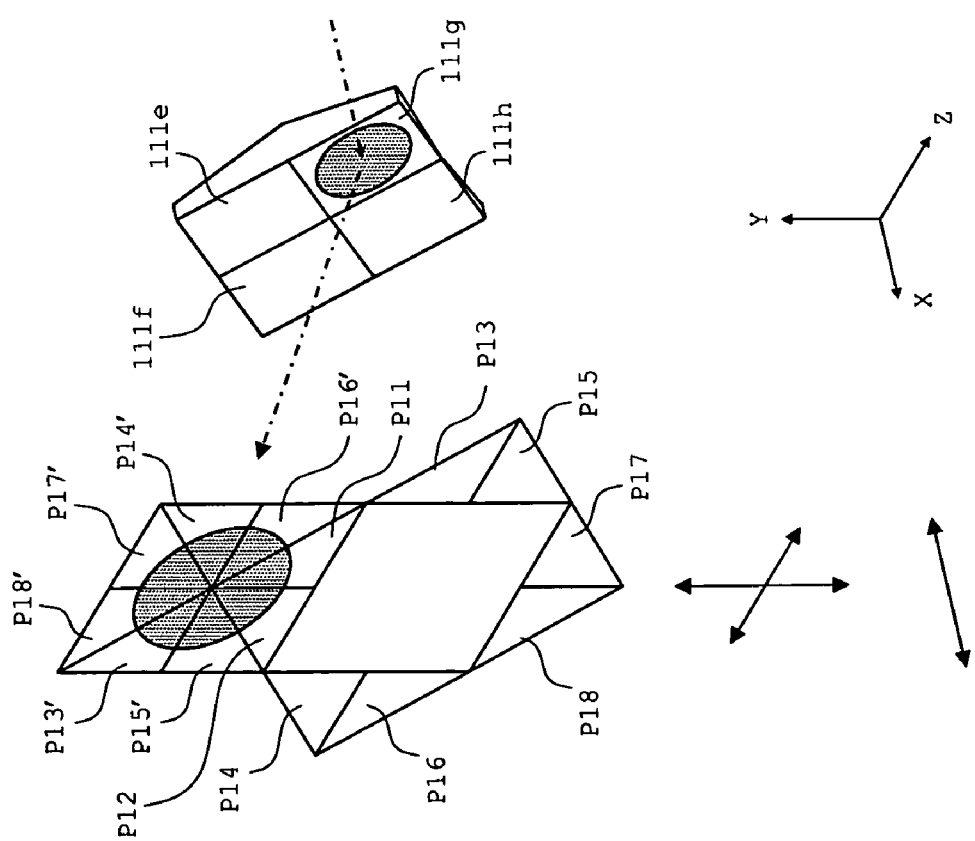

OPTICAL PICKUP APPARATUS AND FOCAL-POINT ADJUSTING METHOD

This application claims priority under 35 U.S.C. Section 119 of Japanese Patent Application No. 2008-54147 filed Mar. 4, 2008, entitled "OPTICAL PICKUP APPARATUS AND FOCAL-POINT ADJUSTING METHOD".

BACKGROUND OF THE INVENTION

1. Field of the Invention

The present invention relates to an optical pickup apparatus and a focal-point adjusting method, and more particularly, relates to an optical pickup apparatus and focal-point adjusting method suitable in use at the time of recording to and reproducing from a recording medium stacked thereon with a plurality of recording layers.

2. Description of the Related Art

In the recent years, along with the increased capacity of optical discs, the multilayered recording layers have been advanced. By including a plurality of recording layers in a single disc, the data capacity of the disc can be increased remarkably. When stacking the recording layers, the general practice until now has been to stack two layers on one side, but recently, to further advance the large capacity, disposing three or more recording layers on one side is also examined. Herein, when the number of recording layers to be stacked is increased, the large capacity of a disc can be promoted. However, on the other hand, the space between recording layers is narrowed, and signal degradation caused by crosstalk between layers increases.

If the recording layer is multilayered, a reflected light from the recording layer to be recorded or reproduced (target recording layer) becomes very weak. Therefore, when unnecessary reflected light (stray light) enters a photodetector from the recording layers present above and below the target recording layer, the detection signal is degraded, which may exert an adverse effect on a focus servo and a tracking servo. Therefore, when a large number of recording layers are disposed in this way, the stray light needs to be removed properly so as to stabilize the signals from the photodetector.

Herein, a method for removing the stray light includes that which uses a pinhole. In this method, a pinhole is disposed at a convergence position of the signal light. According to this method, a part of the stray light is intercepted by the pinhole, and therefore, the unnecessary stray light component entering the photodetector can be reduced. Another method for removing the stray light includes that which combines ½ wavelength plates and polarized light optical elements. According to this method, a polarization direction of the stray light is changed by the ½ wavelength plates, and the stray light is intercepted by the polarized light optical elements. Thus, the unnecessary stray light component entering the photodetector can be removed.

However, in the case of the method for removing the stray light by using a pinhole, the pinhole needs to be positioned accurately at the convergence position of a laser light (signal light) reflected from the target recording layer, and therefore, a task for adjusting the position of the pinhole is difficult, thus posing a problem. If the size of the pinhole is increased to facilitate the task for adjusting the position, the proportion of the stray light passing through the pinhole increases, and the signal degradation caused by the stray light cannot be inhibited effectively.

Furthermore, in the case of the method in which the ½ wavelength plates and the polarized light optical elements are combined to remove the stray light, apart from the fact that the ½ wavelength plates and the polarized light optical elements two each are needed to remove the stray light, a user needs to have two lenses, which increases the number of components and the cost, and adjusting the placement of each component is a complex process, thus posing a problem. Furthermore, the user needs to have a space for placing and arraying these components, which results in the enlargement of the optical system, thus posing a problem.

SUMMARY OF THE INVENTION

An object of the present invention is to provide an optical pickup apparatus and a focal-point adjusting method that can effectively remove a stray light with a simple configuration.

An optical pickup apparatus according to a first aspect of the present invention is provided with: a laser light source; an objective lens for converging the laser light emitted from the laser light source on a recording medium; and an astigmatic element for introducing astigmatism to the laser light reflected by the recording medium. The astigmatic element alienates a first focal line position occurring due to convergence of the laser light in a first direction and a second focal line position occurring due to convergence of the laser light in a second direction vertical to the first direction from each other in an advancing direction of the laser light. The optical pickup apparatus is provided with: an optical element for varying advancing directions of luminous fluxes within four different luminous flux regions with one another, out of the laser light reflected by the recording medium, so as to scatter the luminous fluxes within the four luminous flux regions with one another; and a photodetector for receiving each of the scattered luminous fluxes so as to output a detection signal. When an intersecting point of two mutually crossing straight lines respectively parallel to the first direction and the second direction is aligned to an axis of the laser light, the two luminous flux regions are placed in a direction where a set of vertical angles created by the two straight lines forms a line, and the remaining two luminous flux regions are placed in a direction where the other set of vertical angles forms a line.

According to the optical pickup apparatus according to the first aspect, a relationship between the four luminous flux regions and astigmatism directions (first and second directions) is set as described above. Thereby, it becomes possible that the laser light (signal light) reflected from the target recording layer and the laser light (stray light) reflected from the recording layer present above and/or below the target recording layer does not overlap with each other on the light-receiving surface (a surface where a signal light spot becomes a circle of least confusion at the time of on-focus) of the photodetector. Therefore, only the signal light can be received by the photodetector, and as a result, it becomes possible to inhibit the degradation in the detection signal caused due to the stray light. Furthermore, this effect can be realized only by placing the optical element in the optical path. Thus, according to the optical pickup apparatus according to this aspect, it is possible to effectively remove the influence of the stray light with a simple configuration.

A second aspect of the present invention relates to a focal-point adjusting method for positioning a focal point position of an irradiation light on a target surface. The focal-point adjusting method comprises: introducing astigmatism to the irradiation light reflected by the target surface so as to alienate a first focal line position occurring due to convergence of the irradiation light in a first direction and a second focal line position occurring due to convergence of the irradiation light in a second direction vertical to the first direction from each other in an advancing direction of the irradiation light; varying advancing directions of luminous fluxes within four different luminous flux regions with one another, out of the irradiation light reflected by the target surface, so as to scatter the luminous fluxes within the four luminous flux regions with one another; receiving each of the scattered luminous fluxes by a photodetector; and performing an arithmetic process based on an astigmatic method on a detection signal outputted from the photodetector so as to generate a focus error signal. When an intersecting point of two mutually crossing straight lines respectively parallel to the first direction and the second direction is aligned to an optical axis of the irradiation light, the two luminous flux regions are placed in a direction where a set of vertical angles created by the two straight lines forms a line, and the remaining two luminous flux regions are placed in a direction where the other set of vertical angles forms a line.

Also in the focal-point adjusting method according to the second aspect, an effect similar to that in the optical pickup apparatus according to the first aspect can be demonstrated.

BRIEF DESCRIPTION OF THE DRAWINGS

The above and other objects and novel features of the present invention will become more completely apparent from the description of the embodiment below taken with the following accompanying drawings.

FIG. 4 is a diagram describing the technical principle (a manner in which a light ray advances) according to the embodiment.

FIGS. 5A to 5D are diagrams each describing the technical principle (a splitting pattern and a distribution of a luminous flux) according to the embodiment.

FIGS. 6A to 6D are diagrams each describing the technical principle (a splitting pattern and a distribution of a luminous flux) according to the embodiment.

FIGS. 7A to 7D are diagrams each describing the technical principle (a splitting pattern and a distribution of a luminous flux) according to the embodiment.

FIGS. 8A to 8D are diagrams each describing the technical principle (a splitting pattern and a distribution of a luminous flux) according to the embodiment.

FIGS. 21A and 21B are diagrams each describing the adjusting method of the angle adjusting element and the photodetector according to the embodiment.

However, the diagrams are for the purposes of illustration only, and are not intended to limit the scope of the present invention.

DESCRIPTION OF THE PREFERRED EMBODIMENTS

An embodiment of the present invention will be described below with reference to the drawings.

Technical Principle

Firstly, with reference to FIG. 1A to FIG. 10D, a technical principle applied to this embodiment will be described.

Figure 1B:
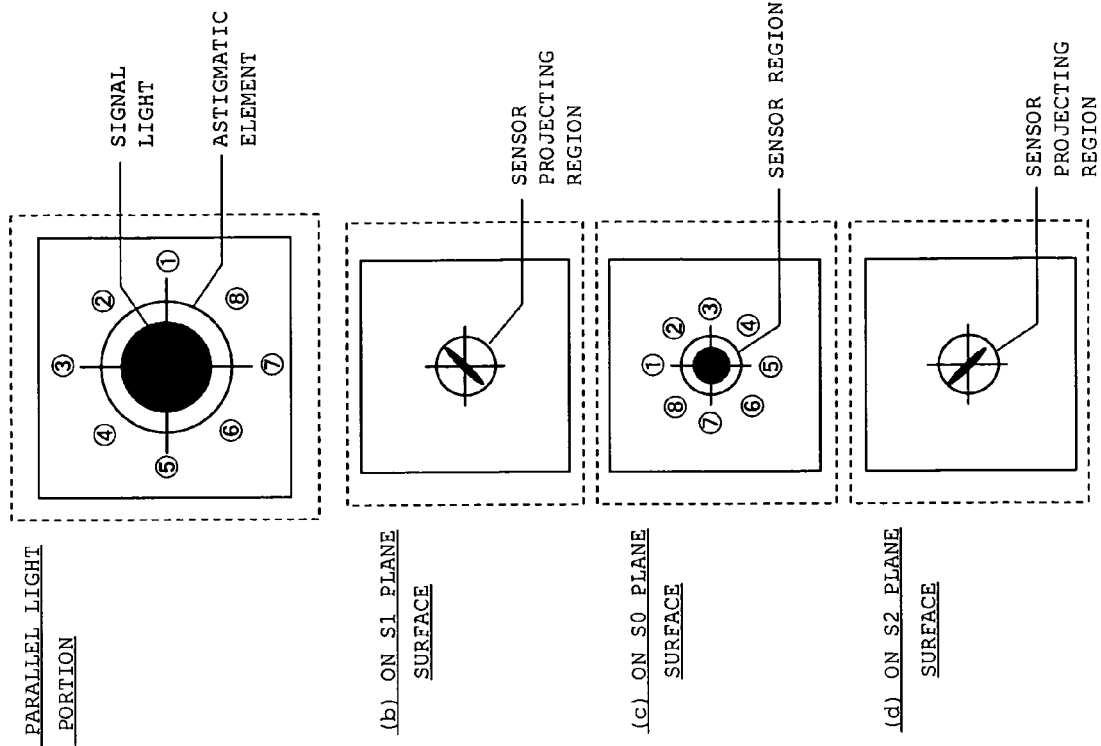
FIGS. 1A and 1B are diagrams each describing a technical principle (a manner in which a light ray advances) according to an embodiment.
Figure 1A:
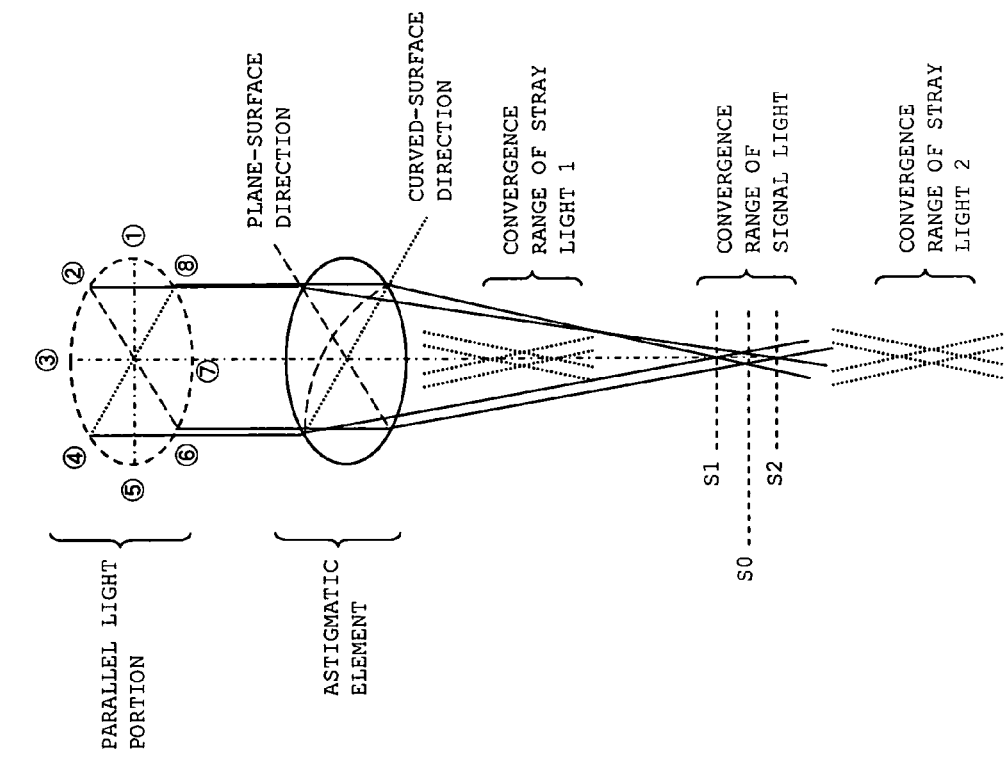

FIG. 1A is a diagram showing a convergence state of a signal light and a stray light, when the laser light (signal light) reflected by a target recording layer enters an astigmatic element, such as an anamorphic lens, in a state of a parallel light. A "stray light 1" is a laser light reflected by a recording layer present on a farther side by one layer than the target recording layer when seen from the side of a laser-light entering surface, and a "stray light 2" is a laser light reflected by a recording layer present on a nearer side by one layer than the target recording layer. FIG. 1A also shows a state when the signal light is focused on the target recording layer.

As illustrated, because of the effect of an anamorphic lens, a focal line occurs on a surface S1 due to the convergence of the signal light in a "curved-surface direction" shown in FIG. 1, and furthermore, a focal line occurs on a surface S2 due to the convergence of the signal light in a "plane-surface direction" shown in FIG. 1, which is vertical to the curved-surface direction. Thus, a spot of the signal light becomes minimum (circle of least confusion) on a surface S0 between the surfaces S1 and S2. In the case of a focus adjustment based on an astigmatic method, the surface S0 is situated as a light-receiving surface of a photodetector. It should be noted that in order to simplify the description of the astigmatic effect in the anamorphic lens, the "curved-surface direction" and the "plane-surface direction" are simply expressed for the sake of convenience, and in reality, an it suffices that the effect for connecting the focal lines in positions different to each other occurs by the anamorphic lens. In this case, the anamorphic lens may also have a curvature in the "plane-surface direction" shown in FIG. 1A.

As shown in FIG. 1A, a focal line position of the stray light 1 (in FIG. 1A, a range between the two focal line positions by the astigmatic element is shown as a "convergence range") is closer to the astigmatic element as compared to the focal line position of the signal light, while a focal line position of the stray light 2 is further away from the astigmatic element as compared to the focal line position of the signal light.

FIGS. 1B(a) to 1B(d) are diagrams each showing a beam shape of the signal light in the parallel light portion and on the surfaces S1, S0, and S2, respectively. The signal light that has been entered on the astigmatic element in a true circle becomes elliptical on the surface S1, then after becoming a substantially true circle on the surface S0, it again becomes elliptical on the surface S2. Herein, the beam shapes formed on the surface S1 and on the surface S2, the respective long axes are vertical to each other.

As shown in FIGS. 1A and 1B(a), if eight positions (Positions 1 to 8: written by encircled numeric figures in FIGS. 1A and 1B) are set up in the anti-clockwise direction on the outer circumference of the beam in the parallel light portion, a light ray passing through the positions 1 to 8 each experiences convergence effect by the astigmatic element. The position 4 and the position 8 are positioned on a parting line when a beam cross section of the parallel light portion is split into two by a parallel straight line in the curved-surface direction, while the position 2 and the position 6 are positioned on a parting line when the beam cross section of the parallel light portion is split into two by a parallel straight line in the plane-surface direction. The Positions 1, 3, 5, and 7 are in the middle of the outer circular arc sectioned by the positions 2, 4, 6, and 8, respectively.

The light ray passing through the position 4 and the position 8 in the parallel light portion enters the surface S0 after being converged to the focal line in the curved-surface direction on the surface S1. Thus, the light ray passing through these positions 4 and 8 passes through the positions 4 and 8 shown in FIG. 1B(c), on the surface S0. Similarly, the light ray passing through the positions 1, 3, 5, and 7 in the parallel light portion also enters the surface S0 after being converged to the focal line in the curved-surface direction on the surface S1, and as a result, the light ray passes through the positions 1, 3, 5, and 7 shown in FIG. 1B(c), on the surface S0. In contrast to this, the light ray passing through the positions 2 and 6 in the parallel light portion enters the surface S0 without being converged to the focal line in the curved-surface direction, on the surface S1. Thus, the light ray passing through these positions 2 and 6 passes through the positions 2 and 6 shown in FIG. 1B(c), on the surface S0.

Figure 2B:
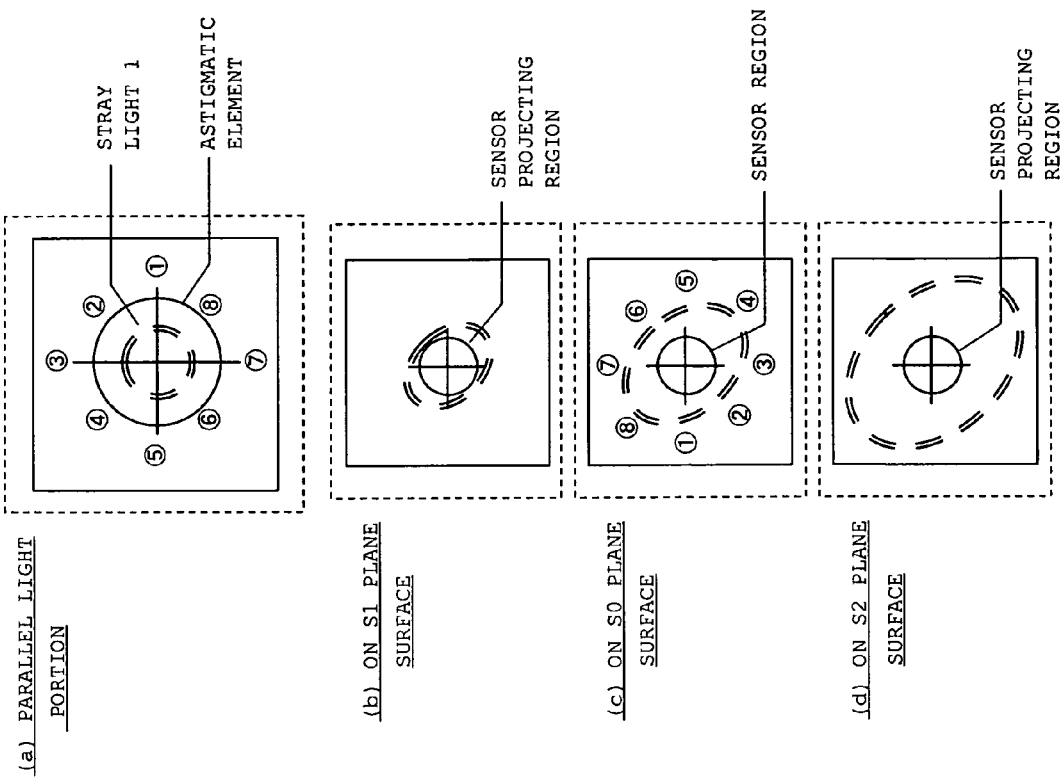
FIGS. 2A and 2B are diagrams each describing the technical principle (a manner in which a light ray advances) according to the embodiment.
Figure 2A:
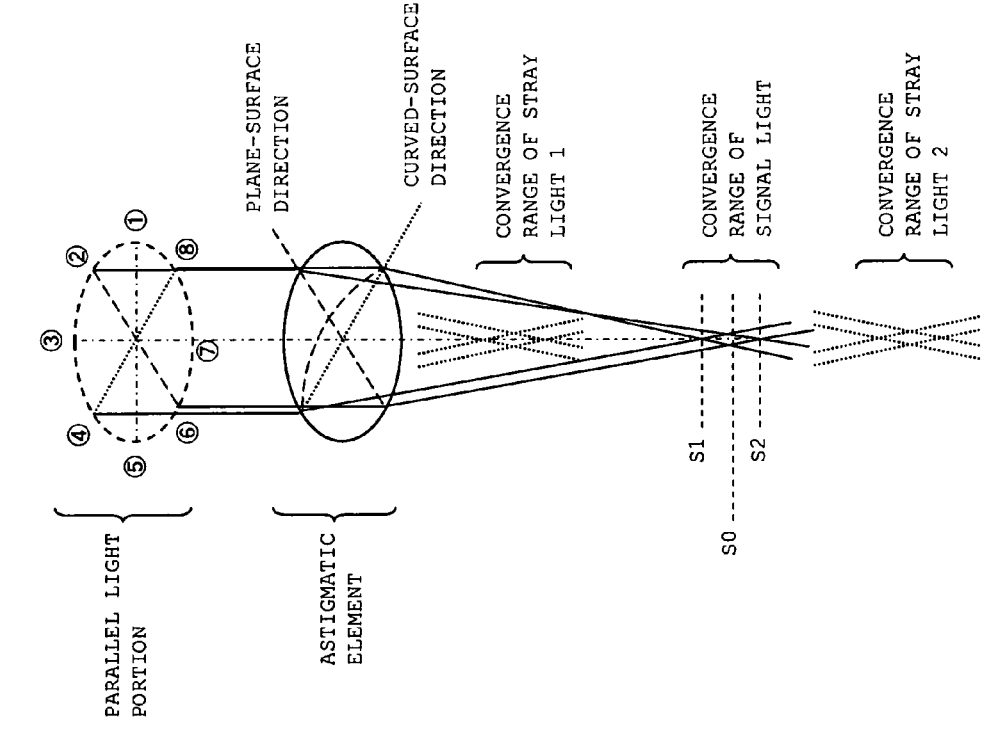

FIGS. 2B(a) to 2B(d) are diagrams each showing beam shapes and light ray passage positions of the stray light 1 in the parallel light portion and on the surfaces S1, S0, and S2, respectively. As shown in FIG. 2B(a), similar to the case of the aforementioned signal light, if eight positions 1 to 8 are set up on the outer circumference of the stray light 1, the light ray passing through these eight positions 1 to 8 enters on the surface S0 after being converged either to the focal line in the curved-surface direction or to the focal line in the plane-surface direction. Thus, the light ray passing through the positions 1 to 8 in the parallel light portion respectively passes through the positions 1 to 8 shown in FIG. 2B(c), on the surface S0.

Figure 3B:
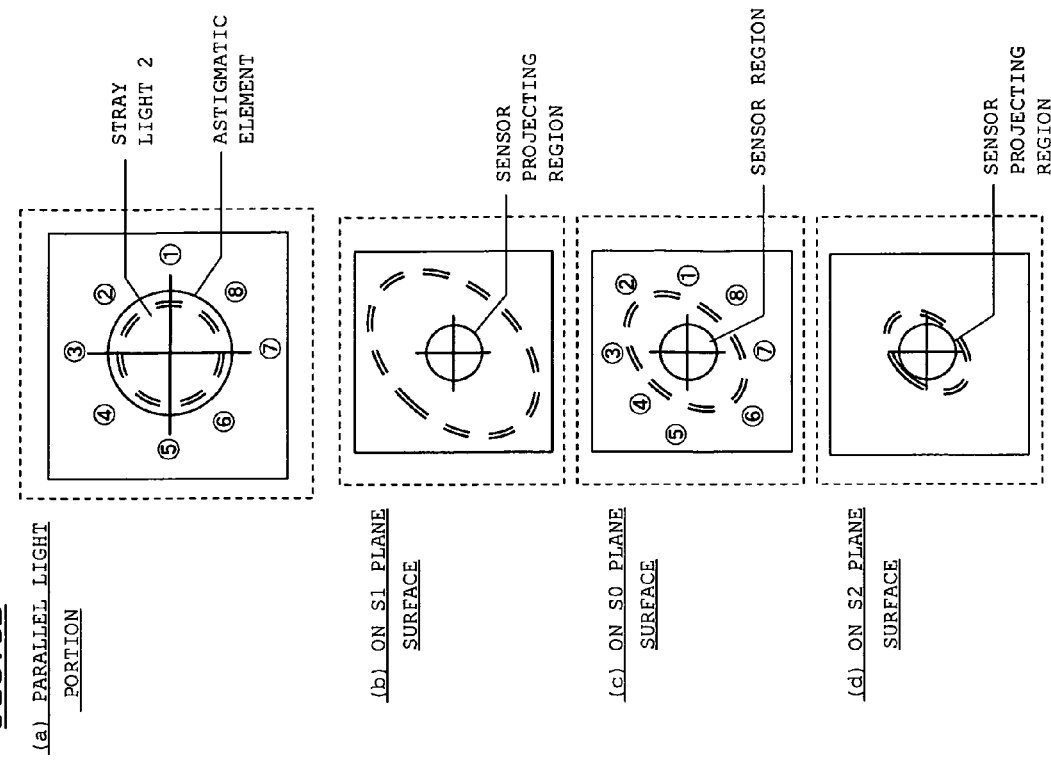
FIGS. 3A and 3B are diagrams each describing the technical principle (a manner in which a light ray advances) according to the embodiment.
Figure 3A:
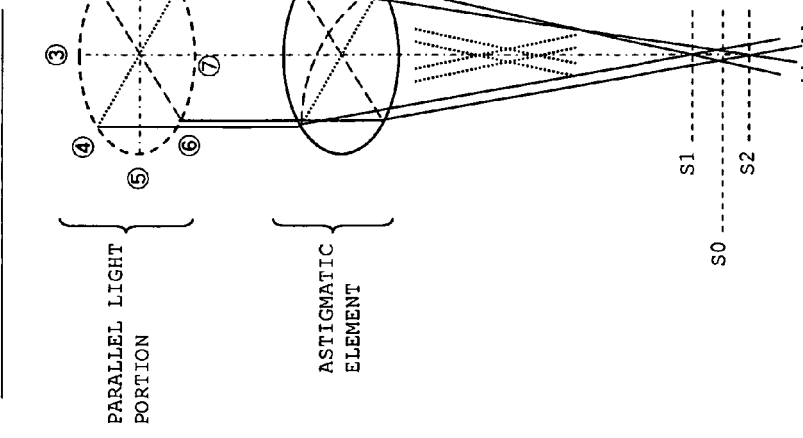

FIGS. 3B(a) to 3B(d) are diagrams each showing beam shapes and light ray passage positions of the stray light 2 in the parallel light portion and on the surfaces S1, S0, and S2, respectively. As shown in FIG. 3B(a), similar to the case of the aforementioned signal light, if eight positions 1 to 8 are set up on the outer circumference of the stray light 2, the light ray passing through these eight positions enters the surface S0 without being converged either to the focal line in the curved-surface direction or to the focal line in the plane-surface direction. Thus, the light ray passing through the positions 1 to 8 in the parallel light portion respectively passes through the positions 1 to 8 shown in FIG. 3B(c), on the surface S0.

FIG. 4 is a diagram in which the beam shapes and the light ray passage positions in the parallel light portion and on the surfaces S1, S0, and S2, described above, are shown by comparing among the signal light, the stray light 1, and the stray light 2. As can be understood by comparing rows shown in FIG. 4(c), luminous fluxes of the signal light, the stray light 1, and the stray light 2 passing through the position 1 in the parallel light portion pass through outer circumference positions different to one another, on the surface S0. Similarly, also the luminous fluxes of the signal light, the stray light 1, and the stray light 2 passing through the positions 3, 4, 5, 7, and 8 in the parallel light portion pass through outer circumference positions different to one another, on the surface S0. The luminous fluxes of the signal light and the stray light 2 passing through the positions 2 and 6 in the parallel light portion pass through the same outer circumference position on the surface S0. Also in this case, the luminous fluxes of the signal light and the stray light 1 passing through the positions 2 and 6 in the parallel light portion pass through outer circumference positions different to one another on the surface S0, and the luminous fluxes of the stray light 1 and the stray light 2 passing through the positions 2 and 6 in the parallel light portion pass through outer circumference positions different to one another on the surface S0.

Subsequently, in consideration of the phenomenon, a relationship between region splitting patterns of the signal light and the stray lights 1 and 2 in the parallel light portion, and irradiating regions of the signal light and the stray lights 1 and 2 on the surface S0 will be examined.

Firstly, as shown in FIG. 5A, the signal light and the stray lights 1 and 2 in the parallel light portion are split by two straight lines inclined at 45 degrees relative to the plane-surface direction and the curved-surface direction, to form four sections, i.e., luminous flux regions A to D. It should be noted that this splitting pattern corresponds to a region split based on the conventional astigmatic method.

In this case, based on the aforementioned phenomenon, the signal light of the luminous flux regions A to D is distributed on the surface S0 as shown in FIG. 5B. Furthermore, based on the aforementioned phenomenon, the stray light 1 and stray light 2 in the luminous flux regions A to D are distributed as shown in FIGS. 5C and 5D, respectively.

Herein, if the signal light and the stray lights 1 and 2 on the surface S0 are extracted for each luminous flux region, the distribution of each light will be as shown in FIGS. 6A to 6D. In such a case, either one of the stray light 1 or the stray light 2 in the same luminous flux region overlaps the signal light in each luminous flux region all the time. Therefore, if the signal light in each luminous flux region is received by a sensor pattern on a photodetector, at least the stray light 1 or the stray light 2 in the same luminous flux region will simultaneously enter the corresponding sensor pattern, thus causing a degradation of the detection signal.

In contrast to this, as shown in FIG. 7A, the signal light and the stray lights 1 and 2 in the parallel light portion are split by two straight lines parallel to the plane-surface direction and the curved-surface direction, to form four sections, i.e., luminous flux regions A to D. In such a case, based on the aforementioned phenomenon, the signal light of the luminous flux regions A to D is distributed on the surface S0 as shown in FIG. 7B. Furthermore, based on the aforementioned phenomenon, the stray light 1 and the stray light 2 of the luminous flux regions A to D are distributed as shown in FIGS. 7C and 7D, respectively.

Herein, if the signal light and the stray lights 1 and 2 on the surface S0 are extracted for each luminous flux region, the distribution of each light will be as shown in FIGS. 8A to 8D. In such a case, neither the stray light 1 nor the stray light 2 in the same luminous flux region overlaps the signal light in each luminous flux region. Therefore, after scattering the luminous fluxes (the signal light, and the stray lights 1 and 2) within each luminous flux region in different directions, if the configuration is such that only the signal light is received by the sensor pattern, only the signal light will enter the corresponding sensor pattern, and the entry of the stray light can be inhibited. Thus, the degradation of the detection signal due to the stray light can be avoided.

As described above, the signal light and the stray lights 1 and 2 are split into the four luminous flux regions A to D by two straight lines parallel to the plane-surface direction and the curved-surface direction, and by dispersing the light passing through these luminous flux regions A to D, and then alienating it on the surface S0, it becomes possible to extract only the signal light. The embodiment is based on this principle.

Figure 9B:
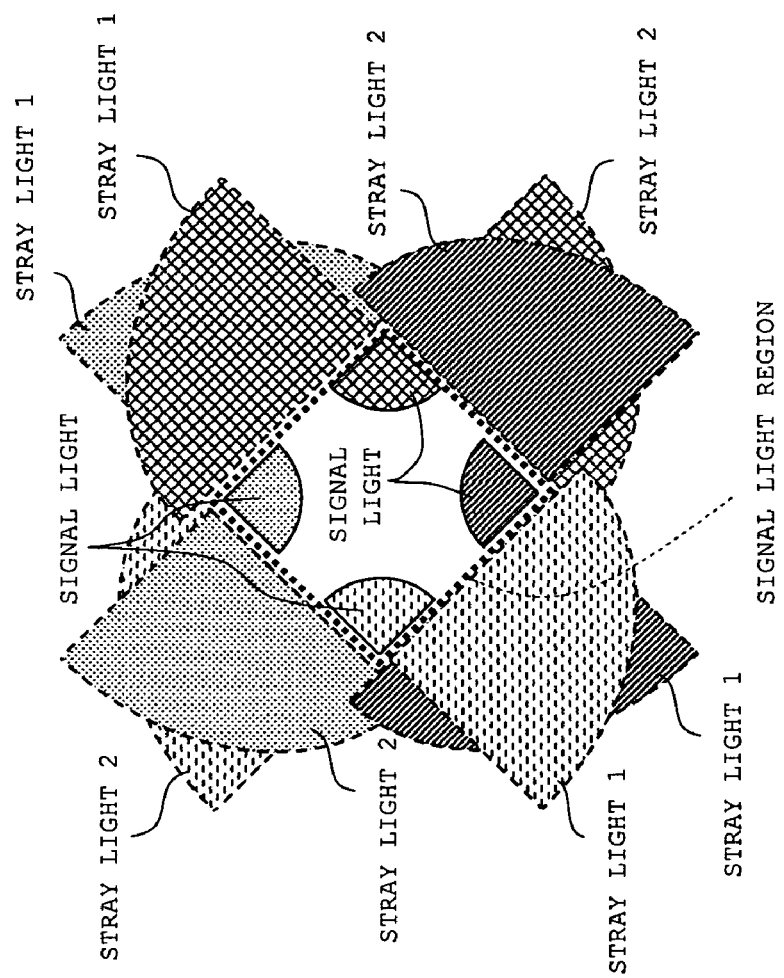
FIGS. 9A and 9B are diagrams each describing the technical principle (an angular provision and a distribution of a luminous flux) according to the embodiment.
Figure 9A:
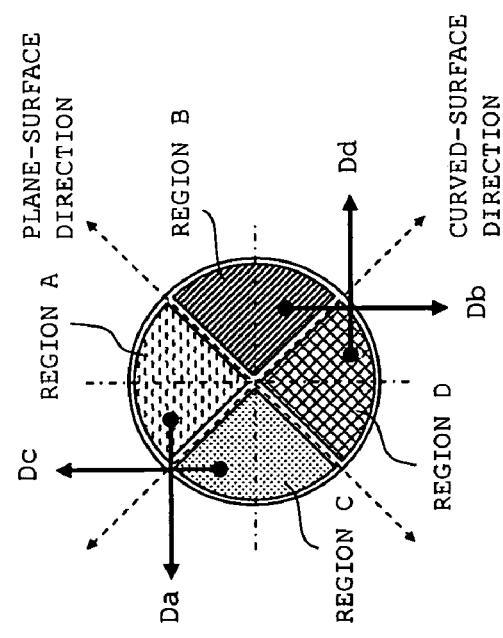

FIGS. 9A and 9B are diagrams each showing distribution states of the signal light and the stray lights 1 and 2 on the surface S0, when advancing directions of the luminous fluxes (the signal light, and the stray lights 1 and 2) passing through the four luminous flux regions A to D shown in FIG. 7A are changed by the same angle in the respectively different directions. Herein, as shown in FIG. 9A, the advancing directions of the luminous fluxes (the signal light, and the stray lights 1 and 2) passing through the luminous flux regions A to D are changed by the same angular amount α (not shown) in the directions Da, Db, Dc, and Dd, respectively. Each of the directions Da, Db, Dc, and Dd are inclined at 45 degrees relative to the plane-surface direction and the curved-surface direction.

In such a case, by regulating the angular amount α in the directions Da, Db, Dc, and Dd, the signal light and the stray lights 1 and 2 in each luminous flux region can be distributed on the plane surface S0, as shown in FIG. 9B. As a result, as shown in FIG. 9B, a signal light region containing only the signal light can be set up on the plane surface S0. By setting a sensor pattern of the photodetector in this signal light region, only the signal light of each region can be received by the corresponding sensor pattern.

Figure 10A:
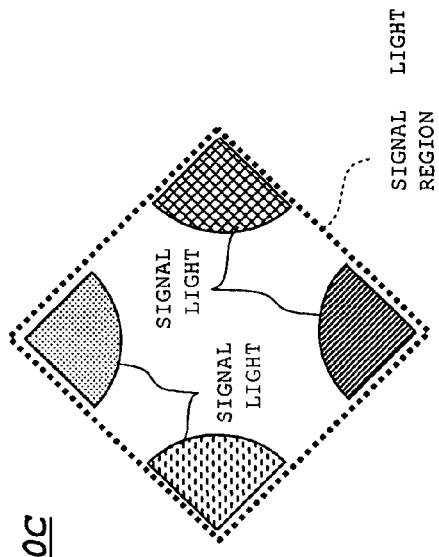
FIGS. 10A to 10D are diagrams each describing a method for placing a sensor pattern according to the embodiment.
Figure 10C:
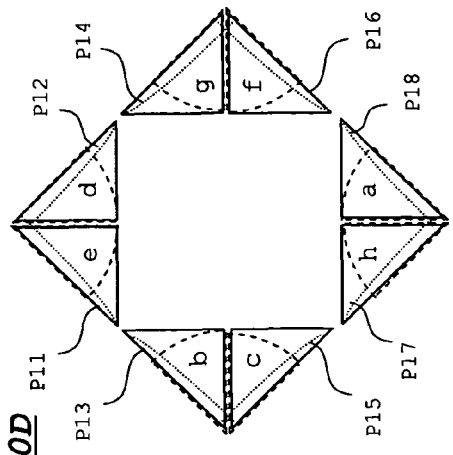
Figure 10B:
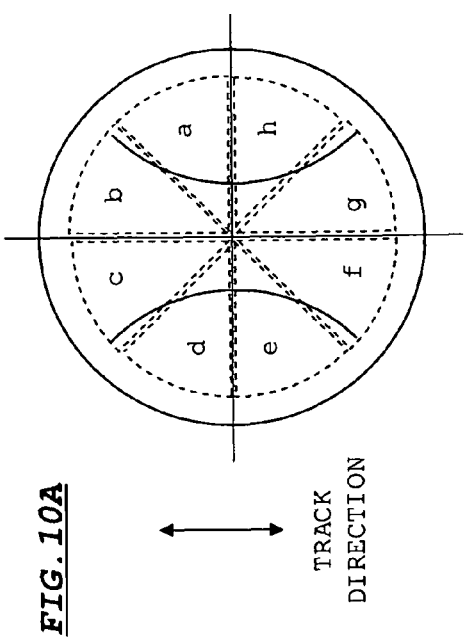
Figure 10D:
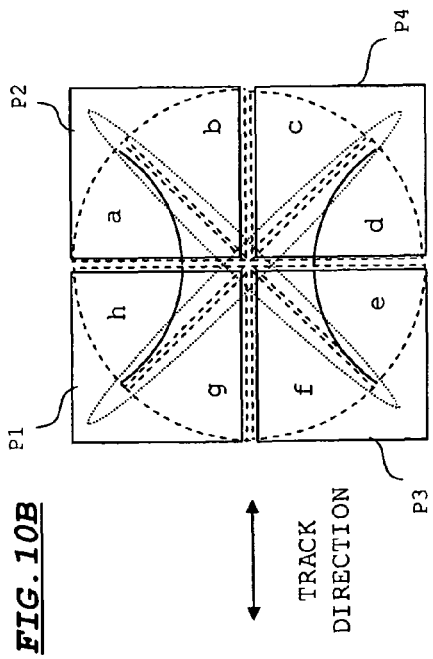

FIGS. 10A to 10D are diagrams each describing a method for placing the sensor pattern. FIGS. 10A and 10B are diagrams each showing a splitting method of the luminous flux and the sensor pattern based on the conventional astigmatic method, while FIGS. 10C and 10D are diagrams each showing a splitting method of the luminous flux and the sensor pattern based on the aforementioned principle. In FIGS. 10A and 10B, for illustration purposes, the luminous flux is sectioned into eight luminous flux regions a to h. Furthermore, a track image is shown by a solid line, and a beam shape at the time of off-focus is shown by a dotted line.

In the conventional astigmatic method, sensor patterns P1 to P4 (quadratic sensor) of a photodetector are set as shown in FIG. 10B. In such a case, if detection signal components based on the light intensity of the luminous flux regions a to h are represented by A to H, a focus error signal FE is evaluated by an arithmetic operation of: FE=(A+B+E+F)−(C+D+G+H), and a push-pull signal PP is evaluated by an arithmetic operation of PP=(A+B+G+H)−(C+D+E+F).

In contrast to this, in the case of the distribution state in FIG. 9B, as described above, the signal light is distributed within the signal light region according to the state shown in FIG. 10C. In such a case, if the distribution of the signal light passing through the luminous flux regions a to h shown in FIG. 10A is overlapped on the distribution shown in FIG. 10C, a distribution as shown in FIG. 10D results. That is, the signal light passing through the luminous flux regions a to h in FIG. 10A is guided into the luminous flux regions a to h shown in FIG. 10D, on the surface S0 on which the sensor pattern of the photodetector is installed.

Therefore, if the sensor patterns P11 to P18 that are shown to be overlapped in FIG. 10D are set to the positions of the luminous flux regions a to h shown in FIG. 10D, the focus error signal and push-pull signal can be generated by the same arithmetic process as that in FIG. 10B. That is, also in this case, if the detection signals from the sensor patterns receiving the luminous flux of the luminous flux regions a to h are represented by A to H, similar to the case in FIG. 10B, the focus error signal FE can be acquired by an arithmetic operation of FE=(A+B+E+F)−(C+D+G+H), and the push-pull signal PP can be acquired by an arithmetic operation of PP=(A+B+G+H)−(C+D+E+F).

As described above, according to this principle, if the signal light and the stray lights 1 and 2 in the parallel light portion are split into the four luminous flux regions A to D by two straight lines parallel to the plane-surface direction and the curved-surface direction shown in FIG. 1A, and the light passing through these luminous flux regions A to D is dispersed, and the dispersed signal light in each luminous flux region A to D is received individually by a light-receiving portion split into two, the focus error signal and push-pull signal can be generated by the same arithmetic process as in the case based on the conventional astigmatic method.

Embodiment

An embodiment based on the principle will be described below.

Figure 11:
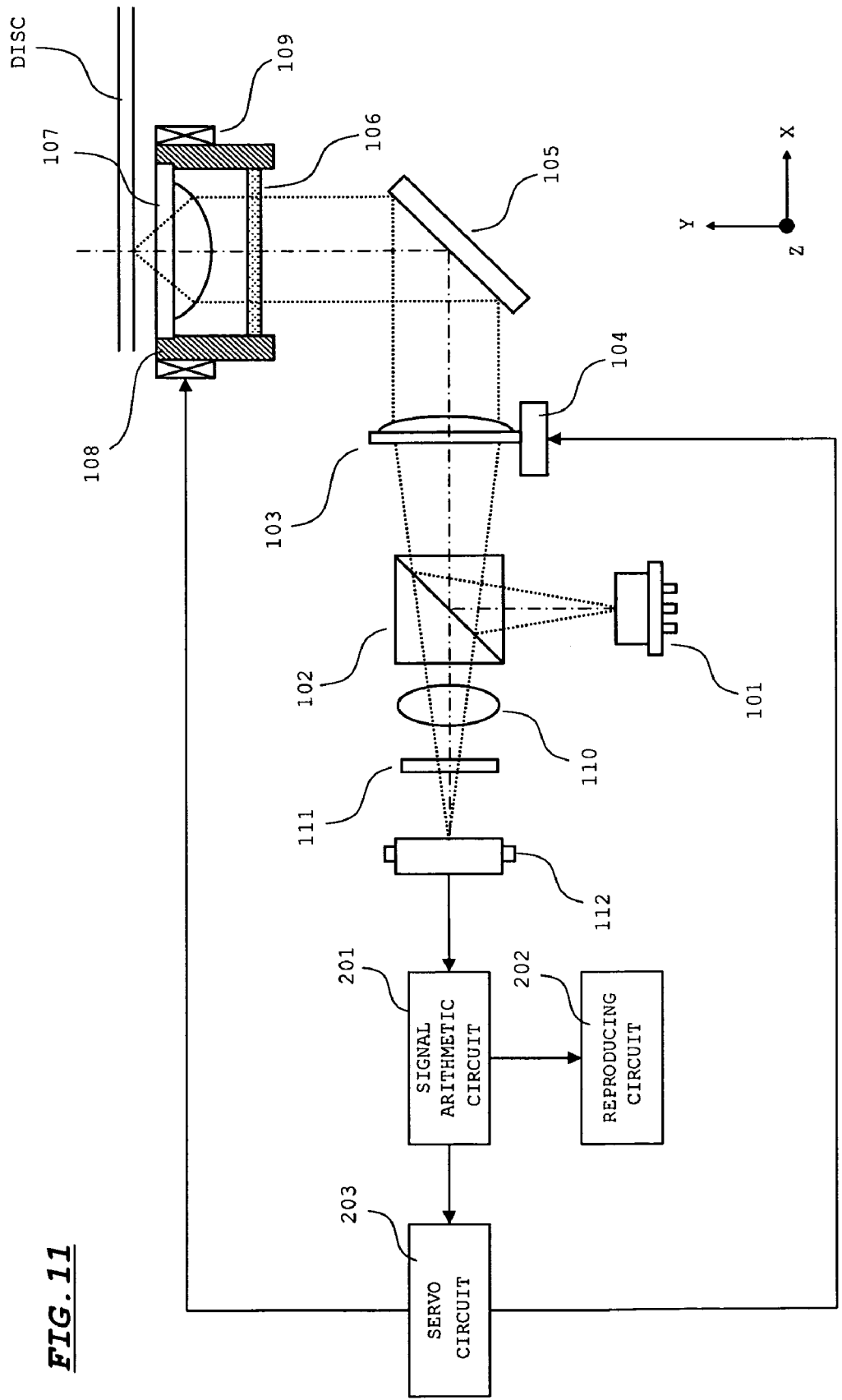
FIG. 11 is a diagram showing an optical system of an optical pickup apparatus according to the embodiment.

FIG. 11 depicts an optical system of the optical pickup apparatus according to the embodiment. It is noted that in FIG. 11, for the sake of convenience, a related circuit configuration is also shown. A plurality of recording layers are stacked and placed on a disc shown in FIG. 11.

As shown in FIG. 11, the optical system of the optical pickup apparatus is provided with: a semiconductor laser 101; a polarizing beam splitter 102; a collimating lens 103; a lens actuator 104; a startup mirror 105; a ¼ wavelength plate 106; an objective lens 107; a holder 108; an objective lens actuator 109; a detection lens 110; an angle adjusting element 111; and a photodetector 112.

The semiconductor laser 101 emits a laser light of a predetermined wavelength. The polarizing beam splitter 102 substantially completely reflects the laser light (S polarized light) entering from the semiconductor laser 101, and at the same time, substantially completely transmits the laser light (P polarized light) entering from the collimating lens 103 side. The collimating lens 103 converts the laser light entering from the polarizing beam splitter 102 side into a parallel light.

The lens actuator 104 displaces the collimating lens 103 in an optical-axis direction according to a servo signal inputted from the servo circuit 203. This corrects the aberration caused in the laser light. The startup mirror 105 reflects the laser light entering from the collimating lens 103 side in a direction towards the objective lens 107.

The ¼ wavelength plate 106 converts the laser light towards the disc into a circular polarized light, and at the same time, converts a reflected light from the disc into a linear polarized light perpendicularly intersecting the polarization direction at the time of heading towards the disc. Thereby, the laser light reflected by the disc is transmitted through the polarizing beam splitter 102.

The objective lens 107 is designed such that the laser light is converged properly in a target recording layer within the disc. The holder 108 holds the ¼ wavelength plate 106 and the objective lens 107 as a single piece. The objective lens actuator 109 is configured by a conventionally well-known electromagnetic driving circuit, and out of the circuit, a coil portion, such as a focus coil, is attached to the holder 108.

The detection lens 110 introduces astigmatism into the reflected light from the disc. That is, the detection lens 110 is equivalent to the astigmatic element of FIG. 1A.

The angle adjusting element 111 changes the advancing direction of the laser light entering from the detection lens 110 side according to the manner described with reference to FIGS. 9A and 9B. That is, the angle adjusting element 111 changes the advancing direction of the luminous flux, out of the laser light that has been entered, passing through the luminous flux regions A to D of FIG. 9A by the same angular amount α, in the directions Da to Dd, respectively. It is noted that the angular amount α is set in a manner that the distribution states of the signal light and the stray lights 1 and 2 on the surface S0 result in the distribution states in FIG. 9B.

The photodetector 112 has the sensor pattern shown in FIG. 10D. The photodetector 112 is placed in a manner that this sensor pattern is positioned at a location of the surface S0 of FIG. 1A. The eight sensors P11 to P18 shown in FIG. 10D are disposed in the photodetector 112, and each of these sensors receives the luminous flux passing through the luminous flux regions a to h of FIG. 10D.

A signal arithmetic circuit 201 performs the arithmetic process, as described with reference to FIG. 10, on the detection signals outputted from the eight sensors of the photodetector 112, and generates a focus error signal and a push-pull signal. Furthermore, the signal arithmetic circuit 201 adds up these detection signals outputted from the eight sensors to generate a reproduction RF signal. The generated focus error signal and push-pull signal are sent to a servo circuit 203, and the reproduction RF signal is sent to a reproduction circuit 202 and the servo circuit 203.

The reproduction circuit 202 demodulates the reproduction RF signal inputted from the signal arithmetic circuit 201 so as to generate reproduction data. The servo circuit 203 generates a tracking servo signal and a focus servo signal from the push-pull signal and the focus error signal inputted from the signal arithmetic circuit 201, and outputs these signals to the objective lens actuator 109. Furthermore, the servo circuit 203 outputs the servo signal in the lens actuator 104 such that the quality of the reproduction RF signal inputted from the signal arithmetic circuit 201 becomes optimum.

Figure 12C:
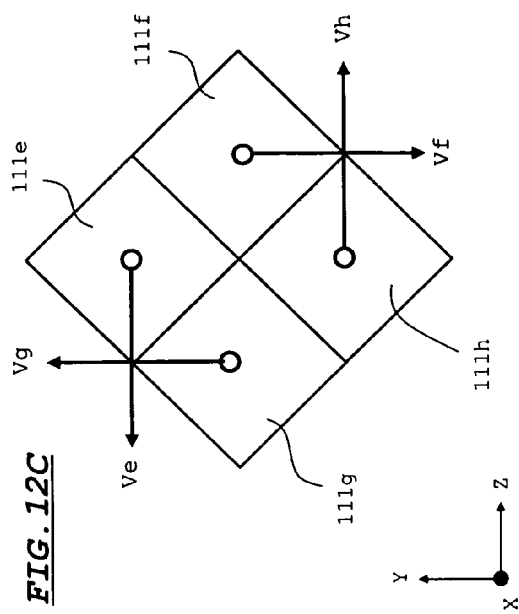
FIGS. 12A to 12C are diagrams each showing a configuration example of an angle adjusting element according to the embodiment.
Figure 12B:
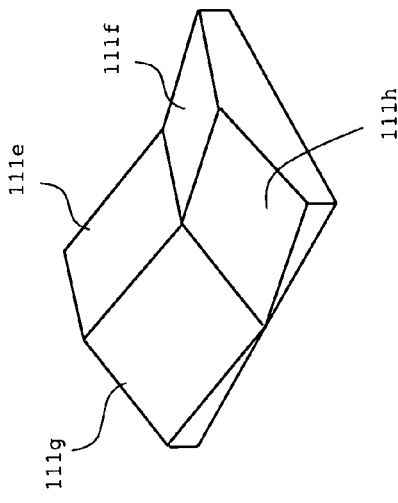
Figure 12A:
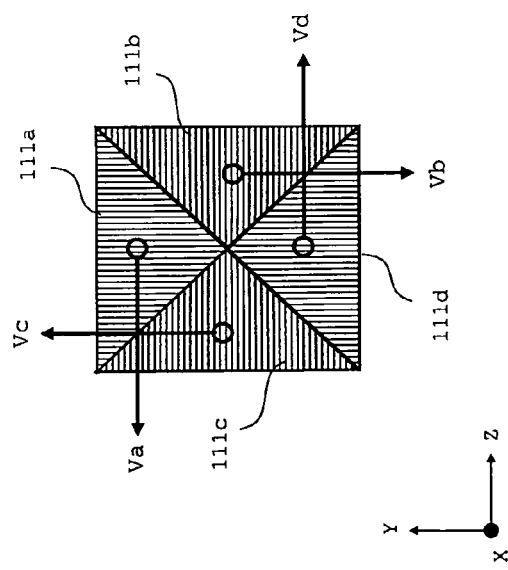

FIGS. 12A to 12C are diagrams each showing a configuration example of the angle adjusting element 111. FIG. 12A shows a configuration example in a case that the angle adjusting element 111 is configured by a hologram element having a diffraction pattern, while FIGS. 12B and 12C show configuration examples in a case that the angle adjusting element 111 is configured by a multi-faced prism.

Firstly, in the configuration example of FIG. 12A, the angle adjusting element 111 is formed by a square-shaped transparent plate, and has a hologram pattern being formed on the light-entering surface. As shown in FIG. 12A, the light-entering surface is sectioned into four hologram regions 111a to 111d. The angle adjusting element 111 is placed after the detection lens 110 so that the laser light (the signal light and the stray lights 1 and 2) passing through the luminous flux regions A to D of FIG. 9A enters in each of the hologram regions 111a to 111d.

The hologram regions 111a to 111d diffract the entered laser light (the signal light and the stray lights 1 and 2) in directions Va to Vd, respectively. The directions Va to Vd coincide with the directions Da to Dd of FIG. 9A. Thus, by means of diffraction, the hologram regions 111a to 111d change the advancing direction of the laser light (the signal light and the stray lights 1 and 2) entering from the detection lens 110 to the directions Da to Dd of FIG. 9A, respectively. A diffraction angle in each region is the same.

Herein, the diffraction angle is so adjusted that the laser light (the signal light and the stray lights 1 and 2) passing through the hologram regions 111a to 111d is distributed as shown in FIG. 9B, on the surface S0 of FIG. 1A. Thus, as described above, if the light-receiving surface of the photodetector 112 having the sensor pattern shown in FIG. 10D is placed on the surface S0, the corresponding signal light can be received properly by the aforementioned eight sensors.

It is noted that the diffraction efficiency of the hologram regions 111a to 111d is the same as one another. If the hologram formed in the hologram regions 111a to 111d is of a step type, the diffraction efficiency is adjusted by the number of steps of the hologram pattern and the height for each step, and the diffraction angle is adjusted by a pitch of the hologram pattern. Therefore, in this case, the number of steps of the hologram pattern and the height for each step are set so that the diffraction efficiency of a previously determined diffraction order reaches an expected value, and also, the pitch of the hologram pattern is adjusted so that the diffraction angle in the diffraction order can provide the distribution shown in FIG. 9B.

It is noted that the hologram formed in the hologram regions 111a to 111d can also be of a blaze type. In this case, a higher diffraction efficiency can be achieved as compared to the step-type hologram. Furthermore, the angle adjusting element 111 can be realized not just by the diffractive effect, but also by a refractive effect.

In the configuration example of FIG. 12B, the angle adjusting element 111 is formed by a transparent body whose light-emitting surface is plane, and the light-entering surface is individually inclined in different directions in four regions. FIG. 12C is a view of FIG. 12B as seen from the light-entering surface side. As shown in FIG. 12C, on the light-entering surface of the angle adjusting element 111, four inclined surfaces 111e to 111h are formed. If a light ray enters these inclined surfaces from the light-entering surface side, in parallel to an X-axis, the advancing direction of the light will change in the direction of Ve to Vh shown in FIG. 12C, respectively, due to the refractive effect caused when the light enters the inclined surfaces 111e to 111h. Herein, the refraction angle in the inclined surfaces 111e to 111h is the same.

The angle adjusting element 111 of FIG. 12B is placed after the detection lens 110 so that the laser light (the signal light and the stray lights 1 and 2) passing through the luminous flux regions A to D of FIG. 9A enters the inclined surfaces 111e to 111h, respectively. If the angle adjusting element 111 is placed in this way, the refraction directions Ve to Vh on the inclined surfaces 111e to 111h coincide with the directions Da to Dd of FIG. 9A. Therefore, by means of the refraction, the inclined surfaces 111e to 111h change the advancing direction of the laser light (the signal light and the stray lights 1 and 2) entering from the detection lens 110 by a constant angle into the directions Da to Dd of FIG. 9A, respectively.

Herein, the refraction angle on each inclined surface is adjusted in a manner that the laser light (the signal light and the stray lights 1 and 2) passing through the inclined surfaces 111e to 111h is distributed as shown in FIG. 9B, on the surface S0 of FIG. 1A. Thus, if the photodetector 112 having the sensor pattern shown in FIG. 10D is placed on the surface S0, the corresponding signal light can be received properly by the aforementioned eight sensors. Because such a refractive effect has a significantly small dependency on the wavelength as compared to the diffractive effect, the adaptability to a change in the wavelength of a light source or to a multi-wavelength light source is high.

It is noted that in the configuration example of FIG. 12A, the hologram regions 111a to 111d are imparted with only the diffractive effect of providing an angle for changing the advancing direction of the laser light by a constant angle. However, besides providing the angle, a hologram pattern that simultaneously exhibits an astigmatic effect caused by the detection lens 110 can also be set to the hologram regions 111a to 111d. Furthermore, it may be also possible that a hologram pattern for providing the aforementioned angle is formed on the light-entering surface of the angle adjusting element 111 and the light-emitting surface of the angle adjusting element 111 is imparted with the hologram pattern for imparting the astigmatic effect. Similarly, also in the angle adjusting element 111 of FIG. 12B, a lens surface may be formed on the light-emitting surface for introducing astigmatism. Alternatively, the inclined surfaces 111e to 111h can be shaped into curved surfaces, and the inclined surfaces 111e to 111h may be imparted with an astigmatic lens effect. In this way, the detection lens 110 can be omitted, and reductions in the number of parts and in cost can be achieved.

Thus, according to the embodiment, from among recording layers disposed in the disc, the overlapping between the signal light reflected from the target recording layer, and the stray lights 1 and 2 reflected from the recording layers present above and below the target recording layer can be prevented from overlapping one another on the light-receiving surface (the surface S0 where the signal light spot becomes a circle of least confusion at the time of on-focus) of the photodetector 112. More specifically, the distribution of the signal light and the stray lights 1 and 2 on the light-receiving surface (surface S0) can be made as shown in FIG. 9B. Therefore, by placing the sensor pattern shown in FIG. 10D in the signal light region of FIG. 9B, only the corresponding signal light can be received by the sensors P11 to P18. Thus, the degradation of the detection signal due to the stray light can be inhibited. Furthermore, this effect can be achieved only by placing the angle adjusting element 111 in an optical path of the laser light reflected by the disc, i.e., between the detection lens 110 and the photodetector 112 in the configuration shown in FIG. 11. Therefore, according to the embodiment, an influence caused due to the stray light can be removed effectively with a simple configuration.

Figure 13:
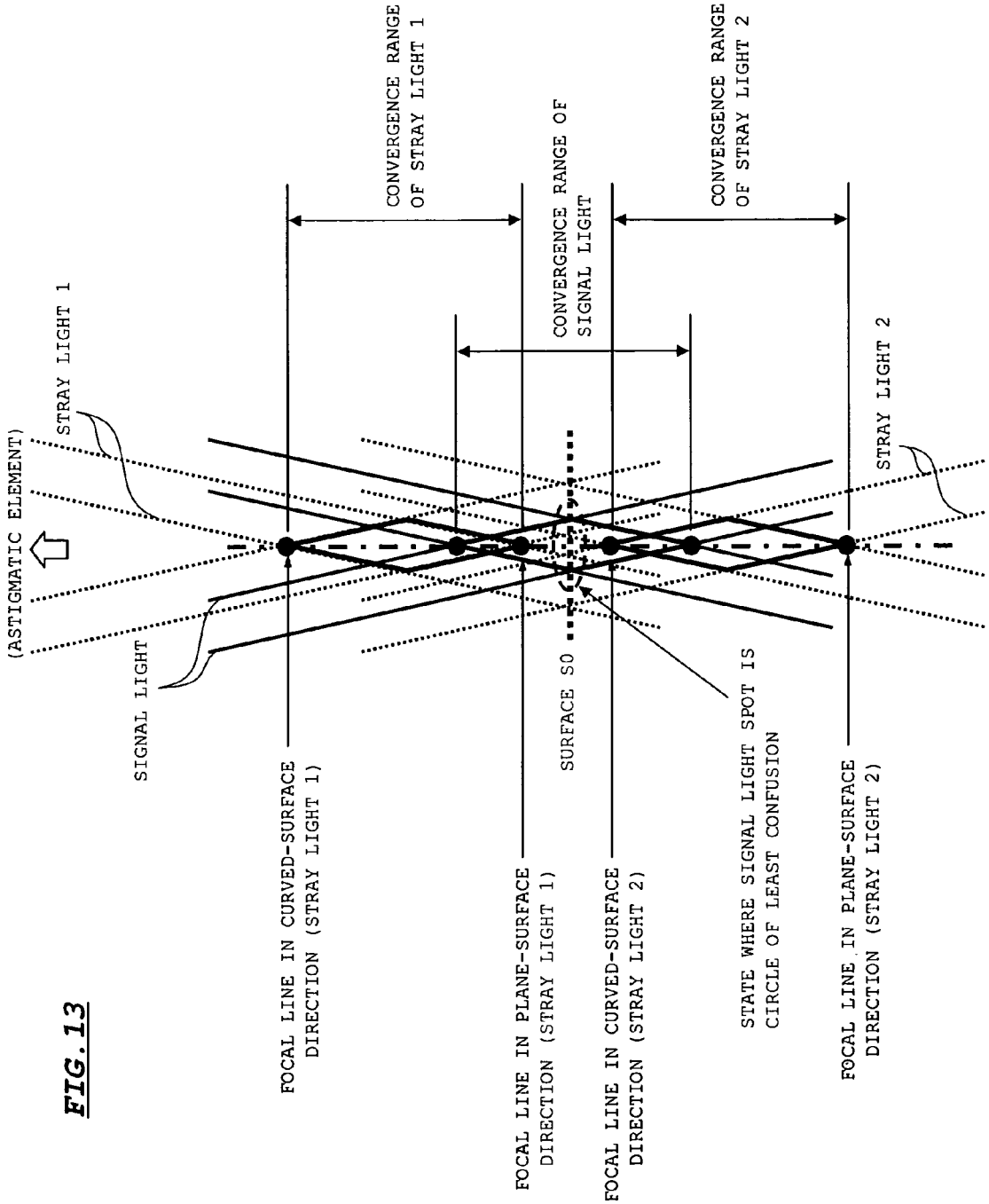
FIG. 13 is a diagram showing a preferred applicable range of the technical principle of the embodiment and the present invention.

It is noted that as shown in FIG. 13, the effect by the aforementioned principle can be demonstrated when the focal line position of the stray light 1 in the plane-surface direction is closer to the astigmatic element than the surface S0 (the surface where the signal light spot becomes a circle of least confusion), and the focal line position of the stray light 2 in the curved-surface direction is further away from the astigmatic element than the surface S0. That is, when this relationship is fulfilled, the distribution of the signal light and the stray lights 1 and 2 becomes the same state as those shown in FIGS. 8A to 8D, and the overlapping between the signal light, and the stray lights 1 and 2 on the surface S0 can be prevented. In other words, as long as this relationship is fulfilled, for example, even if the focal line position of the stray light 1 in the plane-surface direction is closer to the surface S0 than the focal line position of the signal light in the curved-surface direction, or else, even if the focal line position of the stray light 2 in the curved-surface direction is closer to the surface S0 than the focal line position of the signal light in the plane-surface direction, the effects of the present invention and the embodiment based on the aforementioned principle can be demonstrated.

The embodiment of the present invention is thus described above. However, the present invention is not limited thereto, and the embodiment of the present invention can also be modified in various ways apart from the aforementioned description.

For example, in the aforementioned embodiment, the advancing direction of the luminous flux passing through the luminous flux regions A to D is changed to the directions Da to Dd of FIG. 9A. However, as shown in FIG. 14A, the advancing direction may also be changed to a random direction, or may also be changed in the same direction by providing a change to the angular amount. In brief, the luminous flux passing through the luminous flux regions A to D may be dispersed in a manner that the stray light region from the other luminous flux regions is not located on each signal light region of the luminous flux regions A to D shown in FIG. 8A to 8D. In this way, it becomes possible to receive only the respective signal lights by the corresponding sensors, thereby removing the influence of the stray light.

Figure 14B:
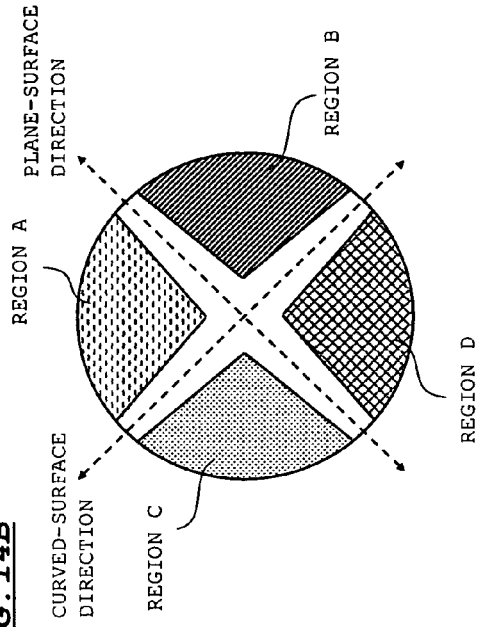
FIGS. 14A to 14D are diagrams each showing a modified example (setting mode of a luminous flux region) of the embodiment.
Figure 14D:
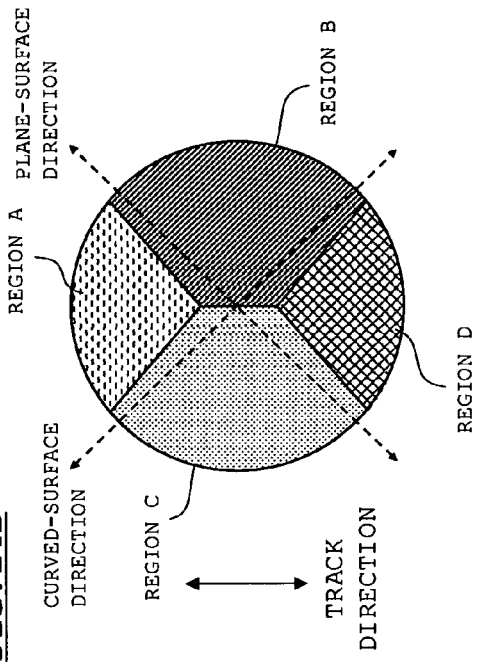
Figure 14A:
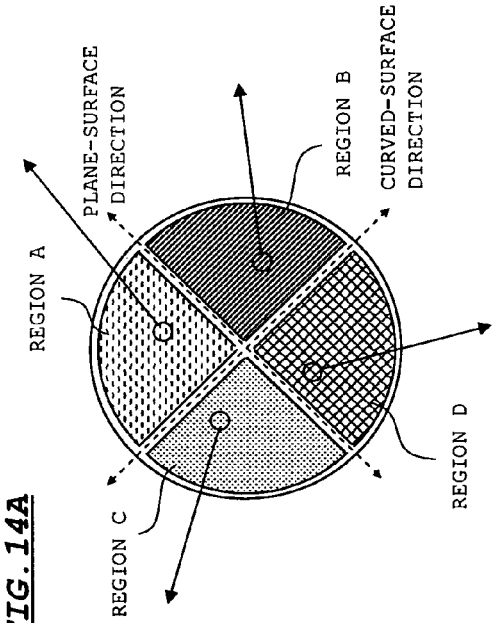
Figure 14C:
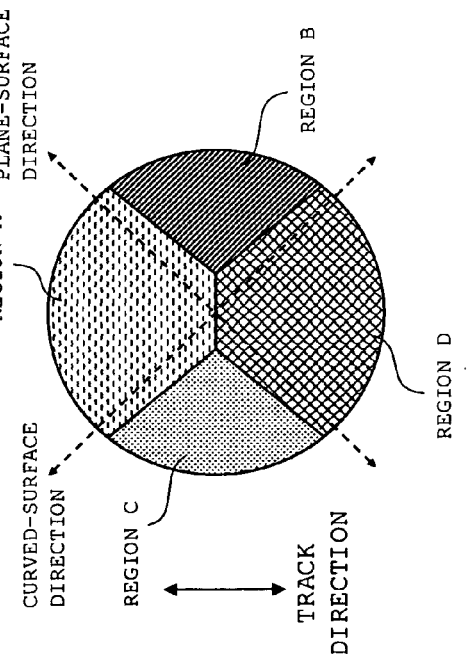

Furthermore, in the aforementioned embodiment, as shown in FIG. 7A, the laser light is uniformly split into four parts, and the luminous flux regions A to D are set, however, as shown in FIG. 14B, the luminous flux regions A to D may also be set so as not to be located on a 2-parting line in the plane-surface direction and a 2-parting line in the curved-surface direction. Alternatively, as shown in FIGS. 14C and 14D, out of the two luminous flux regions positioned in a direction in which vertical angles created by these two 2-parting lines form a line, only the luminous flux regions C and B may be set so as not to be located on these two 2-parting lines (see FIG. 14C), or only the luminous flux regions A and D may be set so as not to be located on two 2-parting lines (see FIG. 14D). It is noted that in FIGS. 14C and 14D, because the stray light component of a part protruding out from the parting lines is superposed on the signal light, the detection signal is slightly degraded, as compared to the aforementioned embodiment. Also, because shapes of the luminous flux regions A to D change as compared to the aforementioned embodiment, shapes of the sensors need to be adjusted according thereto.

Figure 15A:
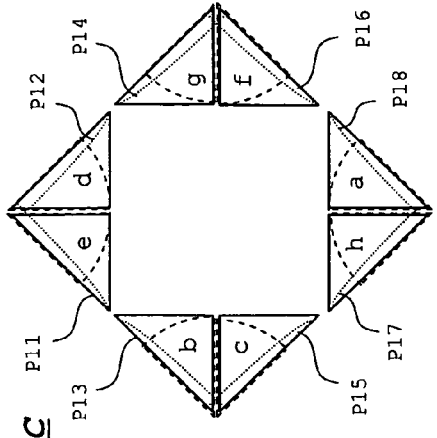
FIGS. 15A to 15D are diagrams each showing a modified example (modified mode of the sensor pattern) of the embodiment.
Figure 15B:
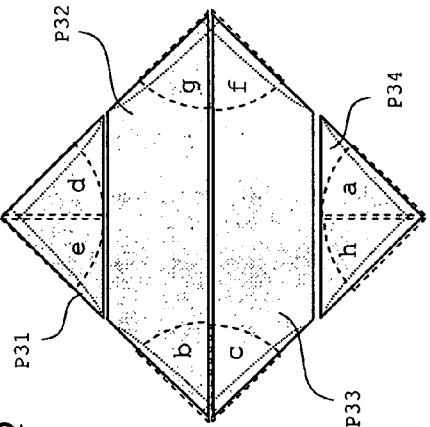
Figure 15C:
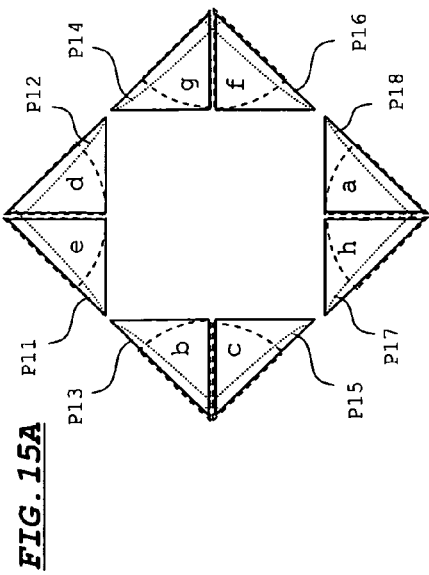
Figure 15D:
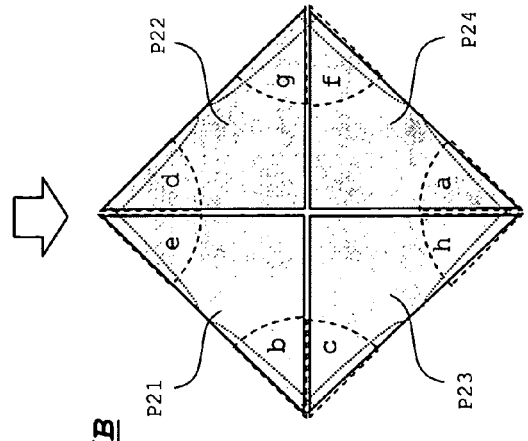

Also, in the aforementioned embodiment, the eight sensors are placed on the light-receiving surface of the photodetector 112. However, as shown in FIG. 15B, the sensors for a focus error signal can be combined together, as a single piece, to form sensors P21 to P24, and as shown in FIG. 15D, the sensors for a push-pull signal can be combined together, as a single piece, to form sensors P31 to P34. Furthermore, the shapes of the sensors P21 to P24 of FIG. 15B can also be changed as shown in FIG. 16B, or the shapes of the sensors P31 to P34 of FIG. 15D can also be changed as shown in FIG. 16D.

Figure 16C:
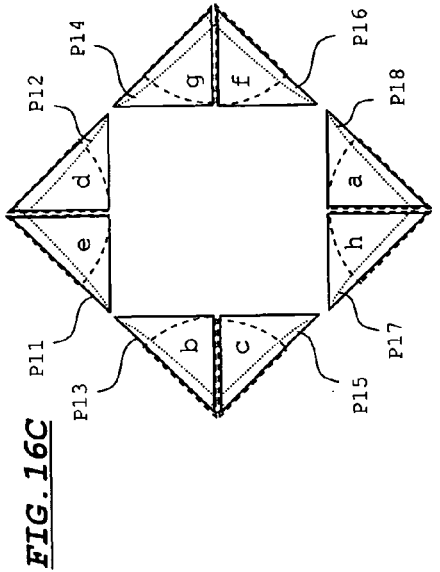
FIGS. 16A to 16D are diagrams each showing a modified example (modified mode the sensor pattern) of the embodiment.
Figure 16D:
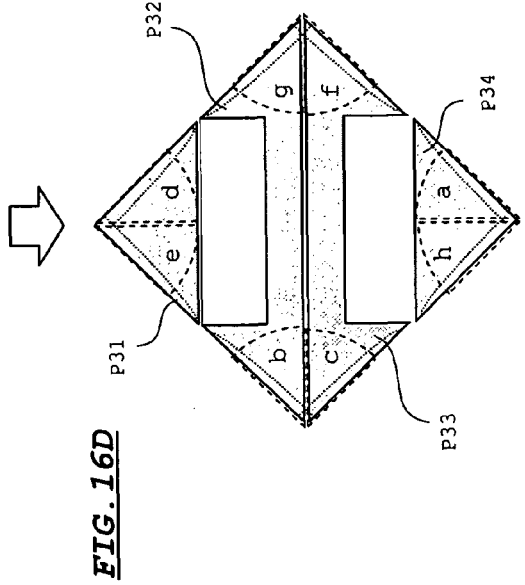
Figure 16A:
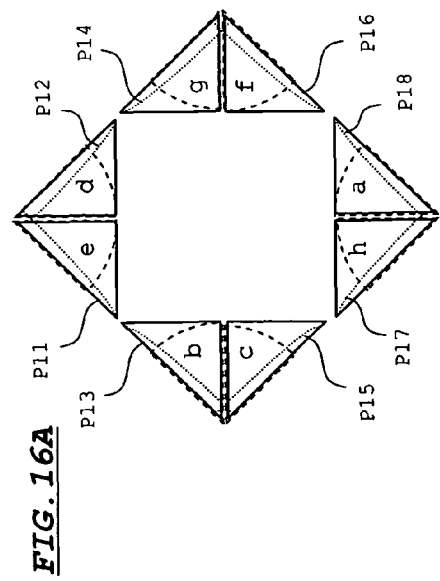
Figure 16B:
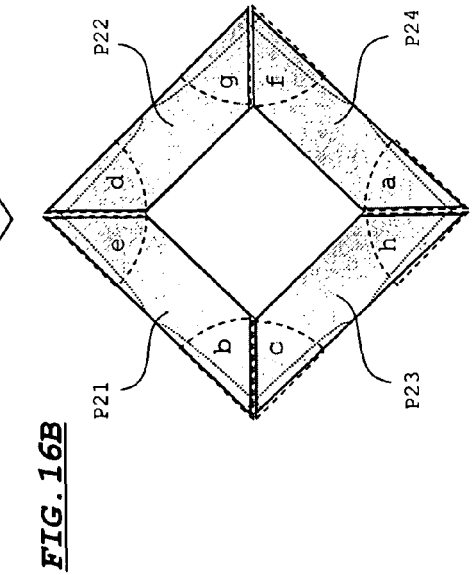
Figure 17:
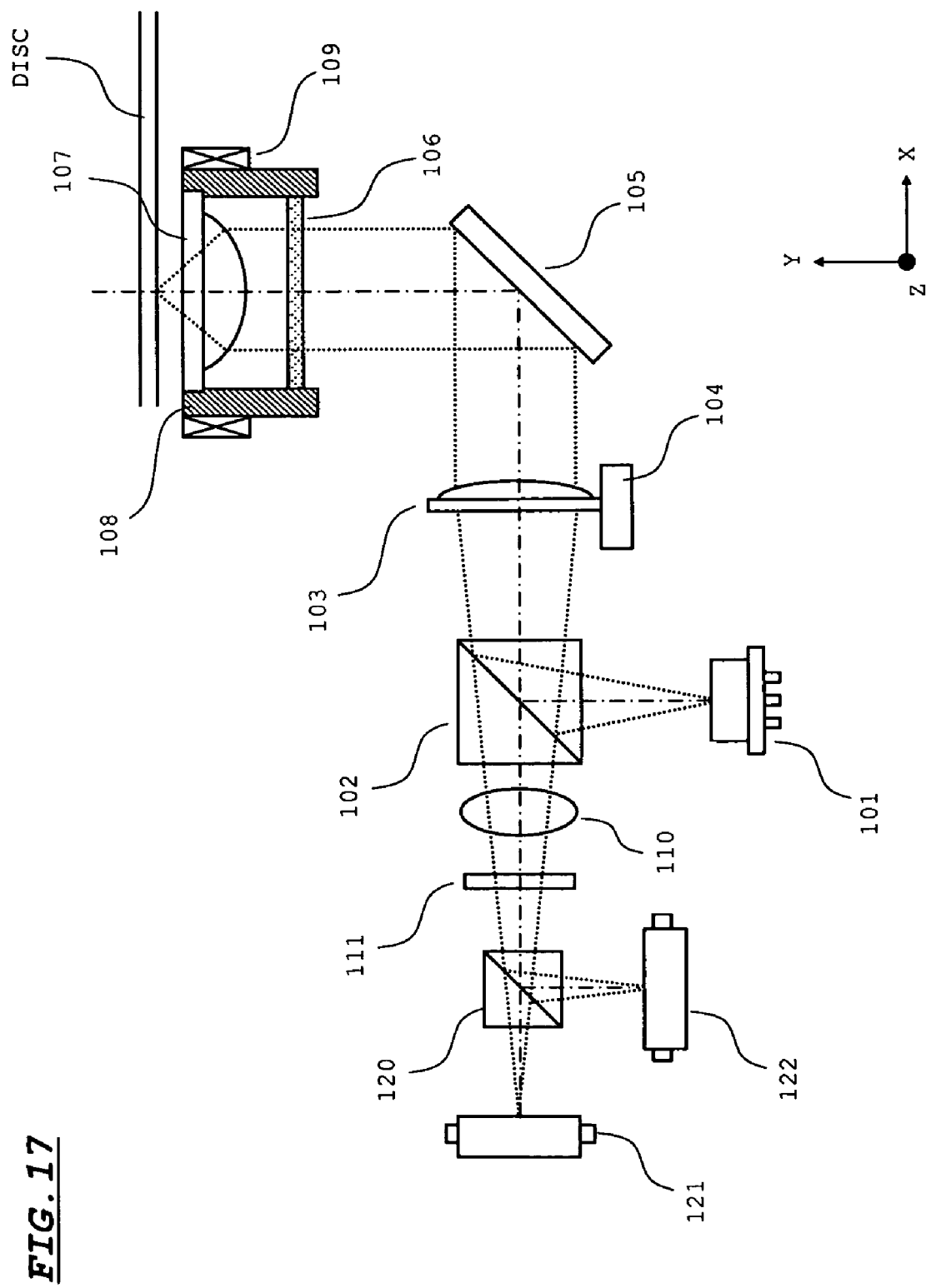
FIG. 17 is a diagram showing a modified example (modified mode of an optical system) of the embodiment.

It is noted that if the sensor pattern is to be configured as shown in FIG. 15B, 15D, 16B, or 16D, the optical system needs to be changed as shown in FIG. 17. That is, in this optical system, the laser light transmitted through the angle adjusting element 111 is split by a non-polarizing beam splitter (such as a half mirror) 120, and the split laser light is received respectively by two photodetectors 121 and 122. For example, the sensor pattern shown in FIG. 15B or FIG. 16B is disposed in the photodetector 121, while the sensor pattern shown in FIG. 15D or FIG. 16D is disposed in the photodetector 122. Thus, the focus error signal is generated based on the detection signal from the photodetector 121, and the push-pull signal is generated based on the detection signal from the photodetector 122. It is noted that similar to the aforementioned embodiment, either one of the photodetectors 121 or 122 may be the sensor pattern shown in FIG. 10D.

FIGS. 18A to 18D are diagrams each showing another configuration example when two split laser lights are received individually by the sensor pattern for a focus error signal and the sensor pattern for a push-pull signal. It is noted that in FIGS. 18A to 18D, for the sake of convenience, only a configuration after the polarizing beam splitter 102 is shown.

Figure 18A:
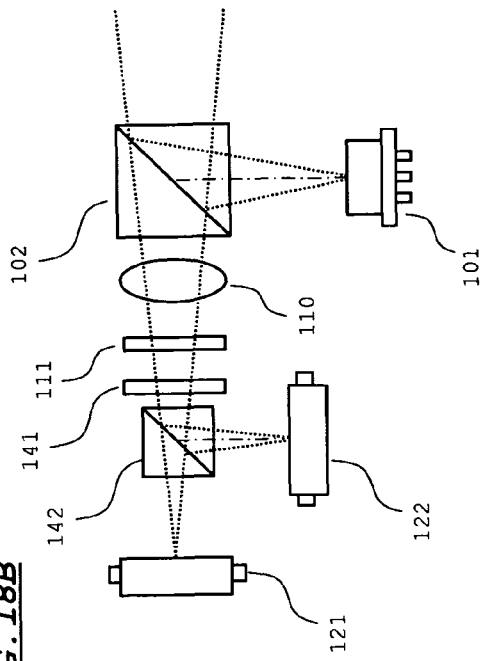
FIGS. 18A to 18D are diagrams each showing a modified example (modified example of the optical system) of the embodiment.

In the configuration example of FIG. 18A, the placement of the angle adjusting element is changed as compared to that in FIG. 17. That is, in this configuration example, two angle adjusting elements 131 and 132 are disposed respectively after the non-polarizing beam splitter 120, and provide the aforementioned angle adjusting effect to the split laser light. Examples of the angle adjusting elements 131 and 132 include that which is configured as shown in FIGS. 12A to 12C. In this case, either one of the angle adjusting elements 131 or 132 can even be omitted. When the angle adjusting element is omitted, a photodetector having the sensor pattern in FIG. 10B is applied, and the focus error signal and the push-pull signal are generated by a normal arithmetic process. In this case, the stray light superimposes the signal light, thus causing the detection signal to degrade.

Figure 18B:
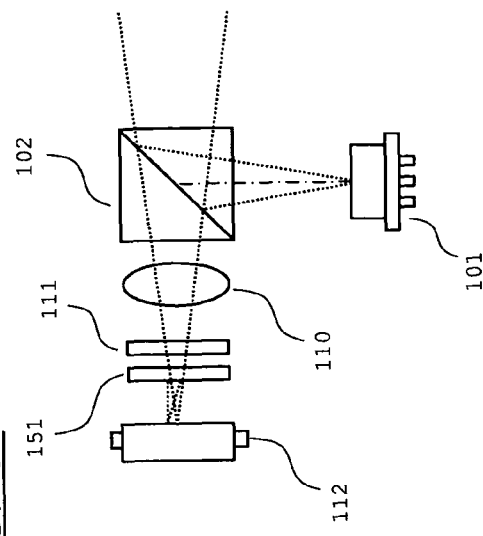

In the configuration example of FIG. 18B, splitting means of the laser light is changed as compared to that in FIG. 17. That is, in this configuration example, the laser light is split by combining a ½ wavelength plate 141 and a polarizing beam splitter 142. By changing the rotation position of the ½ wavelength plate 141 about the optical axis as an axis, the polarization direction of the laser light relative to the polarizing beam splitter 142 is changed, and as a result, a transmission amount and a reflection amount of the laser light relative to the polarizing beam splitter 142 change. That is, in this configuration example, by regulating the rotation position of the ½ wavelength plate 141, a light amount of the laser light guided to the photodetectors 121 and 122 can be regulated.

Figure 18C:
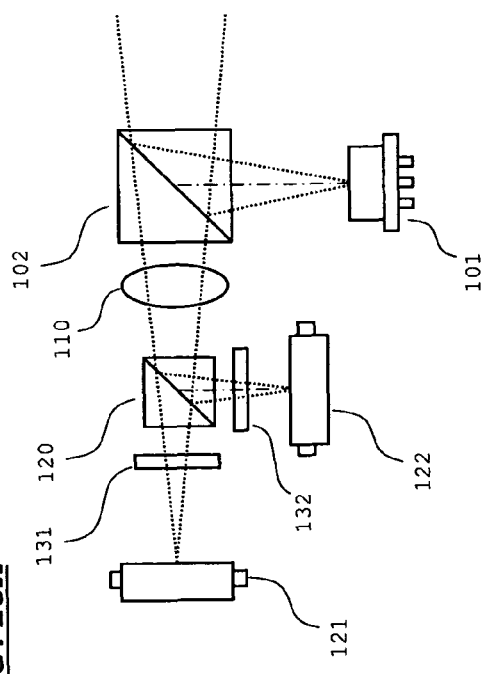
Figure 18D:
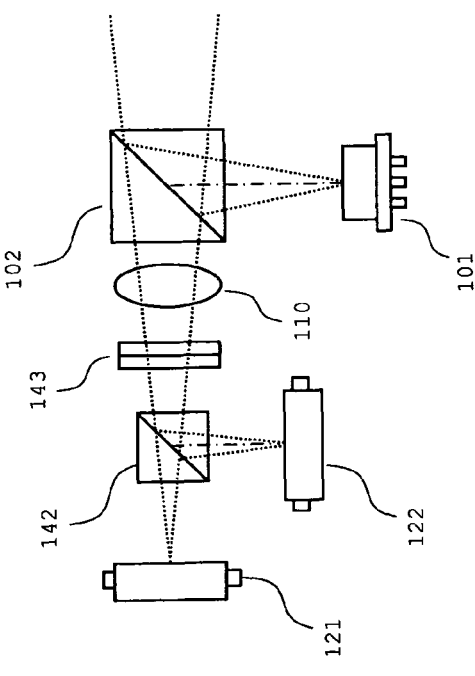

In the configuration example of FIG. 18C, the ½ wavelength plate 141 and the angle adjusting element 111 of the configuration example shown in FIG. 18B are combined together, as a single piece, to form an optical element 143. In this configuration example, if the rotation position of the optical element 143 about the optical axis as its axis is adjusted to a position based on the aforementioned principle, i.e., to a position in which the angle adjusting element is placed as shown in FIG. 9A, the ½ wavelength plate 141 is also simultaneously positioned to where the laser light is guided to the photodetectors 121 and 122 at a previously determined light amount ratio. Thus, in this configuration example, it is possible to further improve the operability as compared the example shown in FIG. 18B.

In this way, in the configuration examples shown in FIGS. 18A to 18C, the laser light is split by using either the non-polarizing beam splitter or the polarizing beam splitter. However, the laser light can also be split by using another optical means. In the configuration example of FIG. 18D, the laser light is split by using a diffraction element 151. Herein, for example, the configuration of the diffraction element 151 is such that a +1-order diffraction light is diffracted by a predetermined angle in one direction from a zero-order diffraction light. In this case, for example, in the photodetector 112, the sensor pattern shown in FIG. 15B or FIG. 16B is disposed in an irradiation position of the +1-order diffraction light, while the sensor pattern shown in FIG. 15D or FIG. 16D is disposed in an irradiation position of the zero-order diffraction light. It is noted that either one of the sensor patterns can also be the sensor pattern shown in FIG. 10D.

Herein, if the diffraction pattern is to be formed in a step-type hologram, then as described above, the light amount ratio of the zero-order diffraction light and +1-order diffraction light can be adjusted by adjusting the number of steps and the height for each step. It is noted that in this configuration example, the diffraction element 151 and the angle adjusting element 111 may be combined together, as a single piece. Also, if the angle adjusting element 111 is configured as shown in FIG. 12A, the hologram pattern in the diffraction element 151 is placed on the light-emitting surface of the angle adjusting element 111, or the hologram pattern on the light-entering surface can be adjusted to a pattern that simultaneously exhibits the diffractive effect in the aforementioned embodiment (angular provision in the luminous flux regions A to D) and the diffractive effect by the diffraction element 151 (splitting of the laser light). In this way, the diffraction element 151 can be omitted, the simplification of the configuration can be implemented while inhibiting a decline in the diffraction efficiency.

Furthermore, in the aforementioned embodiment, the angle adjusting element 111 is placed between the detection lens 110 and the photodetector 112. However, the angle adjusting element may be placed at an arbitrary position in an optical path between the objective lens 108 and the photodetector 112. However, when the angle adjusting element is placed at a position overlapping the optical path of the laser light towards the objective lens 108, the angle adjusting element needs to be so configured that the angle adjusting effect is not imparted to the laser light towards the objective lens 108. For example, when the angle adjusting element is configured as shown in FIGS. 12A to 12C, a hologram element dependent on the polarized light is used as the angle adjusting element. That is, the hologram element is so configured that instead of exhibiting the diffractive effect in the polarization direction of the laser light at the time of heading towards the objective lens 108, the diffractive effect is exhibited in the polarization direction of the laser light that is returning from the objective lens 108.

Figure 19:
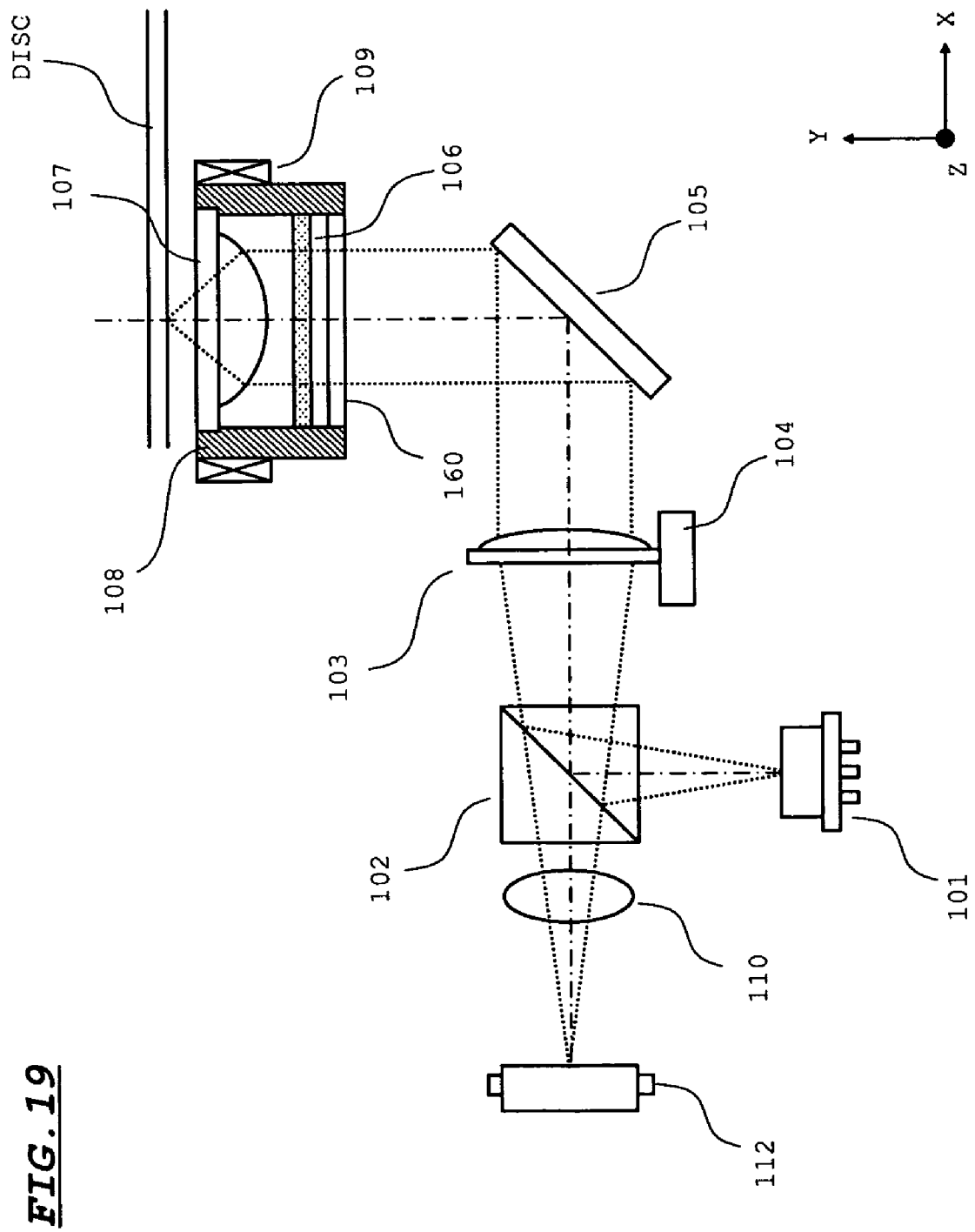
FIG. 19 is a diagram showing a modified example (modified mode of the optical system) of the embodiment.

FIG. 19 is a diagram showing the configuration example in this case. In this configuration example, an angle adjusting element 160 configured by a hologram element dependent on the polarized light is attached to a holder 108. The angle adjusting element 160 does not exhibit the diffractive effect in the laser light (S polarized light) at the time of heading towards the objective lens 108, but exhibits the diffractive effect in the laser light (P polarized light) that is returning from the objective lens 108. In this case, an angle-changing effect for the luminous flux regions A to D is similar to that of FIG. 12A. However, because the length of the optical path between the light-receiving surface of the photodetector 112 and the angle adjusting element 160 is longer than that in the aforementioned embodiment, an angular amount required to change the advancing direction of the laser light becomes smaller as compared to the aforementioned embodiment.

In this configuration example, the angle adjusting element 160 is attached to the holder 108, and therefore, even if the objective lens 107 deviates in a tracking direction, no relative center deviation occurs in the angle adjusting element 160 relative to the return light from the objective lens 108 (reflected light from the disc). Therefore, it is possible to inhibit the degradation of the detection signal caused due to the deviation of the optical axis at the time of a tracking operation.

It is noted that in the aforementioned embodiment, if the objective lens 107 deviates in the tracking direction, the center of the objective lens 107 deviates from the laser light axis, and an offset occurs in the push-pull signal. In this case, for example, in the sensor pattern shown in FIG. 10D, by evaluating the push-pull signal through an arithmetic operation of PP=A+H−(D+E)−k{B+G−(C+F)} (k: adjustment coefficient), an offset component of the push-pull signal occurring at the time of the tracking operation can be reduced. It is noted that if the sensor patterns of FIG. 15D and FIG. 16D are used, the arithmetic operation of A+H, D+E, B+G, and C+F can be omitted during calculation of the push-pull signal, which simplifies the arithmetic process.

Method for Adjusting the Position of the Photodetector and the Angle Adjusting Element In the aforementioned embodiment, the position adjustment of the angle adjusting element 111 and photodetector 112 needs to be performed so that out of the luminous fluxes (the signal light and the stray lights 1 and 2) passing through the luminous flux regions A to D shown in FIG. 9A, the signal light properly enters on the sensor patterns P11 and P12 (shown in FIG. 10D) disposed on the photodetector 112. This adjustment may be performed by the following technique, for example.

Figure 20B:
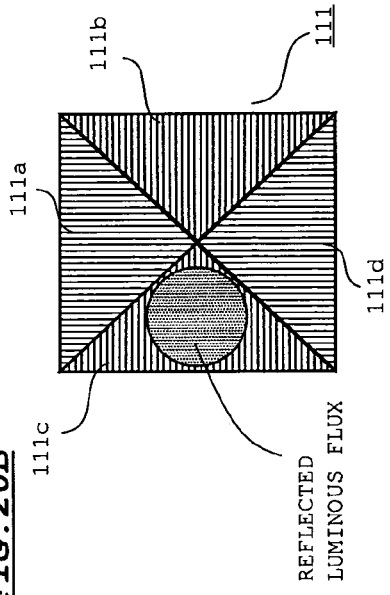
FIGS. 20A to 20D are diagrams each describing an adjusting method of an angle adjusting element and a photodetector according to the embodiment.
Figure 20A:
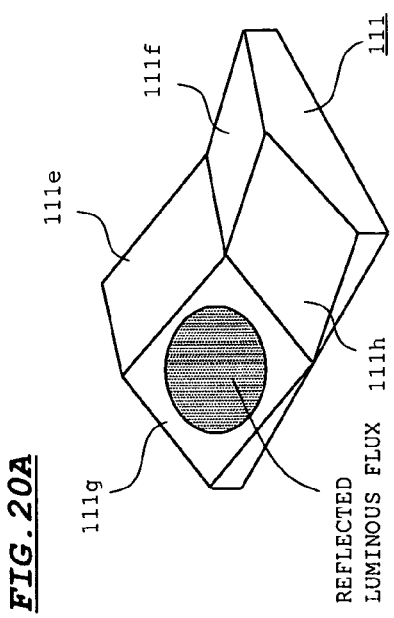
Figure 20D:
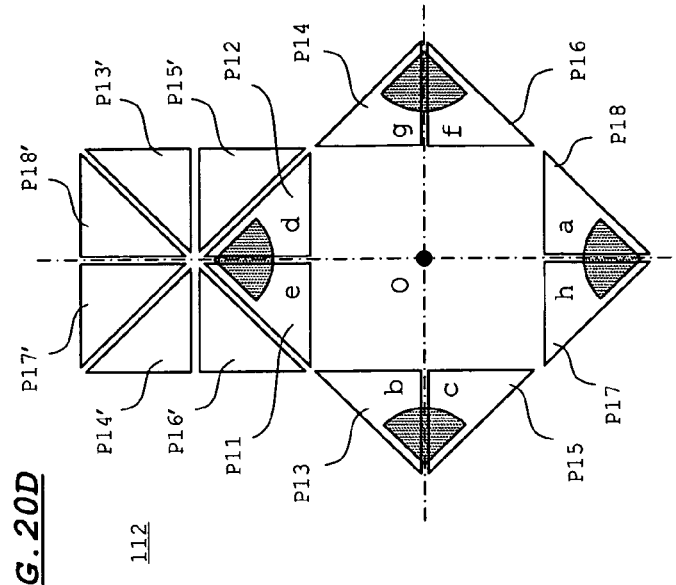
Figure 20C:
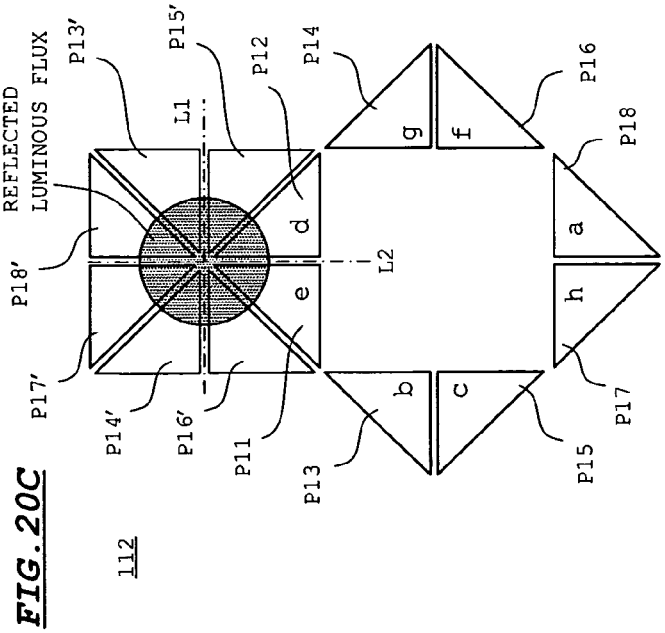

FIGS. 20A, 20C, and 20D, and FIGS. 21A and 21B are diagrams each describing the method for adjusting the positions of the angle adjusting element 111 and photodetector 112. FIG. 20A shows a relationship between the luminous flux and the inclined surfaces when the angle adjusting element 111 is configured by a multi-faced prism, and FIGS. 20C and 20D show the configuration of the photodetector 112 used in this position adjustment.

With reference to FIG. 20A, each of the inclined surfaces 111e to 111h of the angle adjusting element 111 is wide enough to sufficiently include the reflected luminous flux from a disc near the placement position of the angle adjusting element 111. Also, with reference to FIGS. 20C and 20D, sensor patterns P13' to P18' are disposed above the sensor patterns P11 and P12 in the photodetector 112 so as to enable the position adjustment of the photodetector 112 based on the conventional astigmatic method.

It is noted that in a state that the positions of the angle adjusting element 111 and photodetector 112 are adjusted properly, the reflected luminous flux entering the inclined surface 111g is guided to the sensor patterns P11 and P12 of the photodetector 112, as described above.

At the time of adjusting the positions of the angle adjusting element 111 and the photodetector 112, firstly, as shown in FIG. 20A, the angle adjusting element 111 is adjusted roughly and fixed temporarily such that the reflected luminous flux from the disc is collected within the inclined surface 111g.

Herein, as shown in FIG. 20C, the sensor patterns P13' to P18' are disposed above the sensor patterns P11 and P12, and therefore, the reflected luminous flux from the disc is entered on the inclined surface 111g corresponding to the sensor patterns P11 and P12. However, for example, when six sensor patterns are disposed on the left of the sensor patterns P13 and P15 in a mode similar to that in the sensor patterns P13' to P18', the angle adjusting element 111 is fixed temporarily such that the reflected light from the disc enters the inclined surface 111e corresponding to the sensor patterns P13 and P15. Likewise, when six sensor patterns are disposed around the sensor patterns P17 and P18, or the sensor patterns P14 and P16 in a mode similar to that in the sensor patterns P13' to P18', the angle adjusting element 111 is fixed temporarily such that the reflected light from the disc enters the inclined surfaces 111f and 111h corresponding to the sensor patterns P17 and P18, or the sensor patterns P14 and P16.

As shown in FIG. 20A, the reflected luminous flux from the disc that enters the inclined surface 111h is not split up by the angle adjusting element 111, but its advancing direction is changed due to the refractive effect by the angle adjusting element 111. Therefore, due to the optical effect by the detection lens 110, the reflected luminous flux that is transmitted through the angle adjusting element 111 forms an optical spot based on astigmatism on the light-receiving surface of the photodetector 112. The optical spot becomes circular at the time of on-focus while elliptical at the time of off-focus.

Subsequently, in order that this optical spot is properly detected by the photodetector 112 as shown in FIG. 20C, the position of the photodetector 112 is adjusted by an adjusting method based on the conventional astigmatic method by using output signals from the sensor patterns P11, P12, and P13' to P18', and thereby, the photodetector 112 is fixed at the proper position. In this case, the position of the photodetector 112 is adjusted based on the detection signals of the four sensor regions split by parting lines L1 and L2. Thereby, it becomes possible to match the center of gravity of the luminous flux to a target desired position of the photodetector 112.

FIG. 21A is a perspective view of the angle adjusting element 111 and photodetector 112 in this case. As shown in FIG. 21A, the photodetector 112 is positioned in the X-axis direction and in the Y-Z plane.

After positioning the photodetector 112 in this way, the position of the temporarily fixed angle adjusting element 111 is adjusted. With reference to FIG. 20D, the angle adjusting element 111 is moved in a surface vertical to the optical axis, and the angle adjusting element 111 is fixed at a position at which each of the signals detected by the sensors P11 to P18 of the photodetector 112 becomes equal. Thereby, it becomes possible to highly precisely match a crossing point O of the parting lines of the angle adjusting element 111 to the center of gravity of the reflected luminous flux.

FIG. 21B is a perspective view of the angle adjusting element 111 and the photodetector 112 in such a case. As shown FIG. 21B, the angle adjusting element 111 is positioned in the Y-Z plane.

As described above, both the angle adjusting element 111 and the photodetector 112 can be fixed at the proper position. It is noted that when the angle adjusting element 111 is configured by a hologram element having the diffraction pattern as shown in FIG. 20B, each of the hologram regions 111a to 111d is wide enough to sufficiently include the reflected luminous flux from a disc near the placement position of the angle adjusting element 111. In this case, as shown in FIG. 20B, the angle adjusting element 111 is adjusted roughly and fixed temporarily such that the reflected luminous flux from the disc is collected in the hologram region 111c. Thereafter, similar to the aforementioned adjusting method, the position of the photodetector 112 is adjusted by an adjusting method based on the conventional astigmatic method by using the output signals from the sensor patterns P11, P12, and P13' to P18', and then the position of the angle adjusting element 111 is adjusted so that the signal light is guided uniformly into the sensor patterns P11 to P18.

It is noted that when the angle adjusting element 111 is configured by a hologram element, the position can also be adjusted using a zero-order diffraction light, instead of using the aforementioned adjusting method.

Figure 22A:
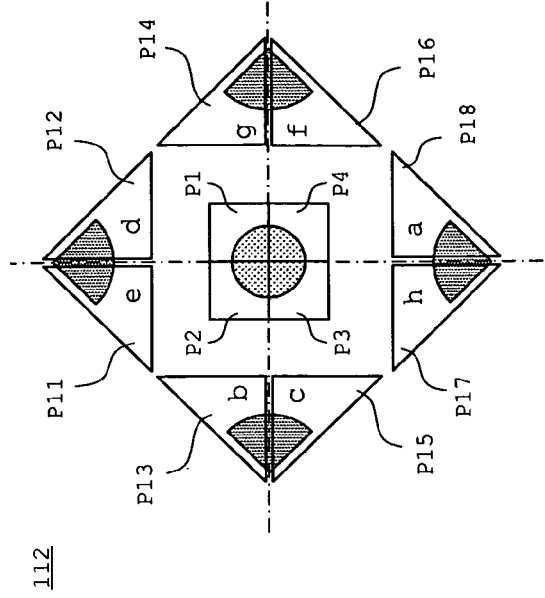
FIGS. 22A to 22D are diagrams each describing another adjusting method of the angle adjusting element and the photodetector according to the embodiment.
Figure 22B:
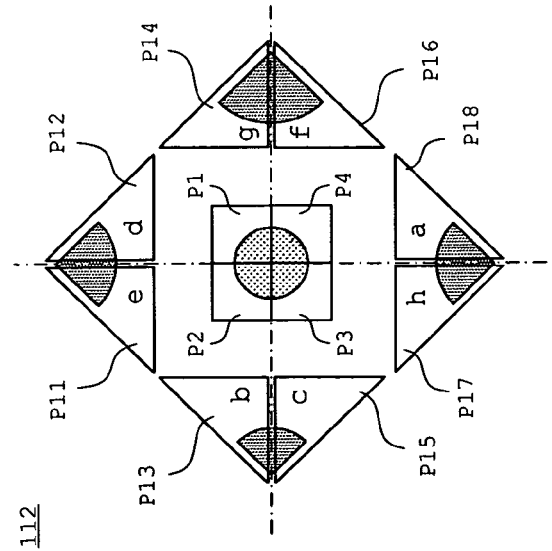

In this case, the sensor patterns shown in FIGS. 22A and 22B are disposed in the photodetector 112. That is, in the photodetector 112, the sensor patterns P1 to P4 (quadratic sensor) based on the conventional astigmatic method are disposed in the center of the aforementioned sensor patterns P11 to P18.

Furthermore, in the hologram regions 111a to 111d of the angle adjusting element 111, besides the aforementioned effect used to bend the advancing direction of the reflected luminous flux, a diffraction pattern that allows the zero-order diffraction light to occur only by a light amount by a predetermined diffraction efficiency is disposed. In this case, unlike shown in FIG. 20B, the hologram regions 111a to 111d need not to be wide enough to sufficiently include the reflected luminous flux from the disc.

Figure 22C:
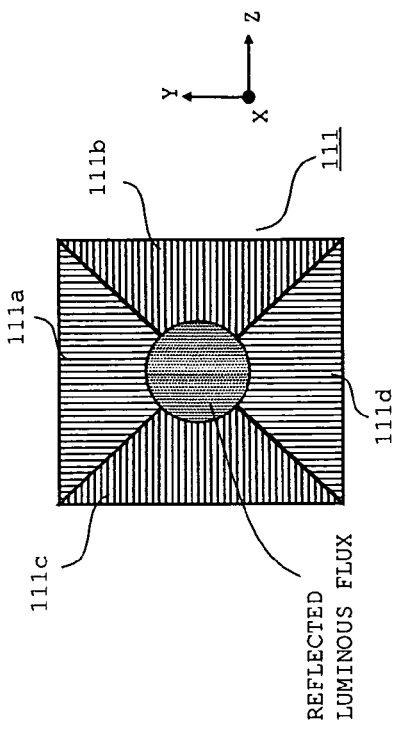
Figure 22D:
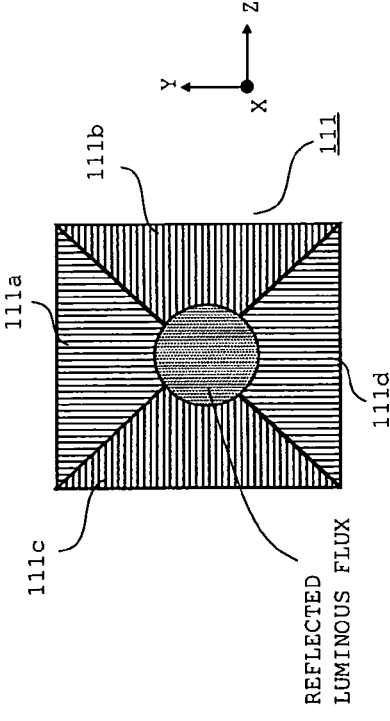

According to this adjusting method, firstly, as shown in FIG. 22C, the angle adjusting element 111 is fixed temporarily in a state that the luminous flux reflected from the disc enters a substantially center. Subsequently, in order that the zero-order diffraction light reaches a state, as shown in FIG. 22A, on the sensor patterns P1 to P4, the position of the photodetector 112 is adjusted by an adjusting method based on the conventional astigmatic method by using the output signals from the sensor patterns P1 to P4, thereby fixing the photodetector 112 at the proper position. Thereafter, as shown in FIG. 22D, the angle adjusting element 111 is moved in the Y-Z plane, and the angle adjusting element 111 is fixed at a position at which each of the signals detected by the sensor patterns P11 to P18 becomes equal. Thereby, in the sensor patterns P11 to P18, the signal light is distributed equally, as shown in FIG. 22B. Thus, it becomes possible to position both the angle adjusting element 111 and the photodetector 112 at the proper position.

It is noted that in this case, because the zero-order diffraction light enters the sensor patterns P1 to P4, and as a result, the light amount of the signal light entering the sensor patterns P11 to P18 is reduced by that much amount. Also, the stray light of the zero-order diffraction light that has transmitted the angle adjusting element 111 enters the sensor patterns P11 to P18. However, the configuration of the photodetector 112 is more simplified as compared to the position adjusting method shown in FIGS. 20A to 20D and FIGS. 21A and 20B, and therefore, the miniaturization of the optical pickup apparatus can be realized.

Besides, the embodiment of the present invention may be modified in various ways, where appropriate, within the range of the technological idea set forth in the claims.

What is claimed is:

1. An optical pickup apparatus, comprising:
    a laser light source;
    an objective lens for converging the laser light emitted from the laser light source on a recording medium;
    an astigmatic element for introducing astigmatism to the laser light reflected by the recording medium so as to alienate a first focal line position occurring due to convergence of the laser light in a first direction and a second focal line position occurring due to convergence of the laser light in a second direction vertical to the first direction from each other in an advancing direction of the laser light;
    an optical element for varying advancing directions of luminous fluxes within four different luminous flux regions with one another, out of the laser light reflected by the recording medium, so as to scatter the luminous fluxes within the four luminous flux regions with one another; and
    a photodetector for receiving each of the scattered luminous fluxes so as to output a detection signal; wherein
    when an intersecting point of two mutually crossing straight lines respectively parallel to the first direction and the second direction is aligned to an axis of the laser light, the two luminous flux regions are placed in a direction where a set of vertical angles created by the two straight lines forms a line, and the remaining two luminous flux regions are placed in a direction where the other set of vertical angles forms a line.

2. The optical pickup apparatus according to claim 1, wherein
    the four luminous flux regions are set such that out of two sets of the luminous flux regions placed in a direction where the vertical angles form a line, at least one set is not located on the two straight lines.

3. The optical pickup apparatus according to claim 1, wherein
    the four luminous flux regions are set by splitting a whole luminous flux region of the laser light by the two straight lines.

4. The optical pickup apparatus according to claim 1, wherein
    the optical element changes the advancing direction of the four luminous flux regions so that each of the scattered luminous flux is guided to each of positions of four different rectangular vertical angles on a light-receiving surface of the photo detector.

5. The optical pickup apparatus according to claim 1, wherein
    the photo detector has eight sensor portions for receiving eight split luminous flux regions formed by further splitting the four luminous flux regions along two parting lines inclined at 45 degrees with respect to the two straight lines.

6. The optical pickup apparatus according to claim 4, further comprising an optical-path branching element for branching an optical path of the laser light that has been introduced with the astigmatism, into two, wherein
    the photo detector comprises first and second photo detectors for receiving each of the two laser lights branched by the optical-path branching element.

7. The optical pickup apparatus according to claim 6, wherein
    the first photo detector has a sensor pattern in which out of the eight split luminous flux regions formed by further splitting the four luminous flux regions in two by two parting lines inclined at 45 degrees with respect to the two straight lines, the two split luminous flux regions added with a light amount at the time of the generation of the push-pull signal are received by one sensor portion.

8. The optical pickup apparatus according to claim 6, wherein
    the second photo detector has a sensor pattern in which out of the eight split luminous flux regions formed by further splitting the four luminous flux regions in two by two parting lines inclined at 45 degrees with respect to the two straight lines, the two split luminous flux regions added with a light amount at the time of the generation of a focus error signal based on an astigmatic method are received by one sensor portion.

9. The optical pickup apparatus according to claim 1, wherein
the optical element is disposed in an optical path between the astigmatic element and the photo detector.

10. The optical pickup apparatus according to claim 1, wherein
the optical element is attached, as a single piece, to a holder for holding the objective lens.

11. A focal-point adjusting method for positioning a focal point position of an irradiation light on a target surface, comprising:
introducing astigmatism to the irradiation light reflected by the target surface so as to alienate a first focal line position occurring due to convergence of the irradiation light in a first direction and a second focal line position occurring due to convergence of the irradiation light in a second direction vertical to the first direction from each other in an advancing direction of the irradiation light;
varying advancing directions of luminous fluxes within four different luminous flux regions with one another, out of the irradiation light reflected by the target surface, so as to scatter the luminous fluxes within the four luminous flux regions with one another;
receiving each of the scattered luminous fluxes by a photo detector; and
performing an arithmetic process based on an astigmatic method on a detection signal outputted from the photo detector so as to generate a focus error signal, wherein;
when an intersecting point of two mutually crossing straight lines respectively parallel to the first direction and the second direction is aligned to an optical axis of the irradiation light, the two luminous flux regions are placed in a direction where a set of vertical angles created by the two straight lines forms a line, and the remaining two luminous flux regions are placed in a direction where the other set of vertical angles forms a line.

* * * * *